Sept. 26, 1967 R. H. BODE ET AL 3,343,334
METHOD AND APPARATUS FOR BUNDLING STACKED MATERIAL
Filed Feb. 28, 1963 11 Sheets-Sheet 1

INVENTORS
ROBERT H. BODE
IRA D. BOYNTON
BY
Wheeler, Wheeler & Wheeler
ATTORNEYS

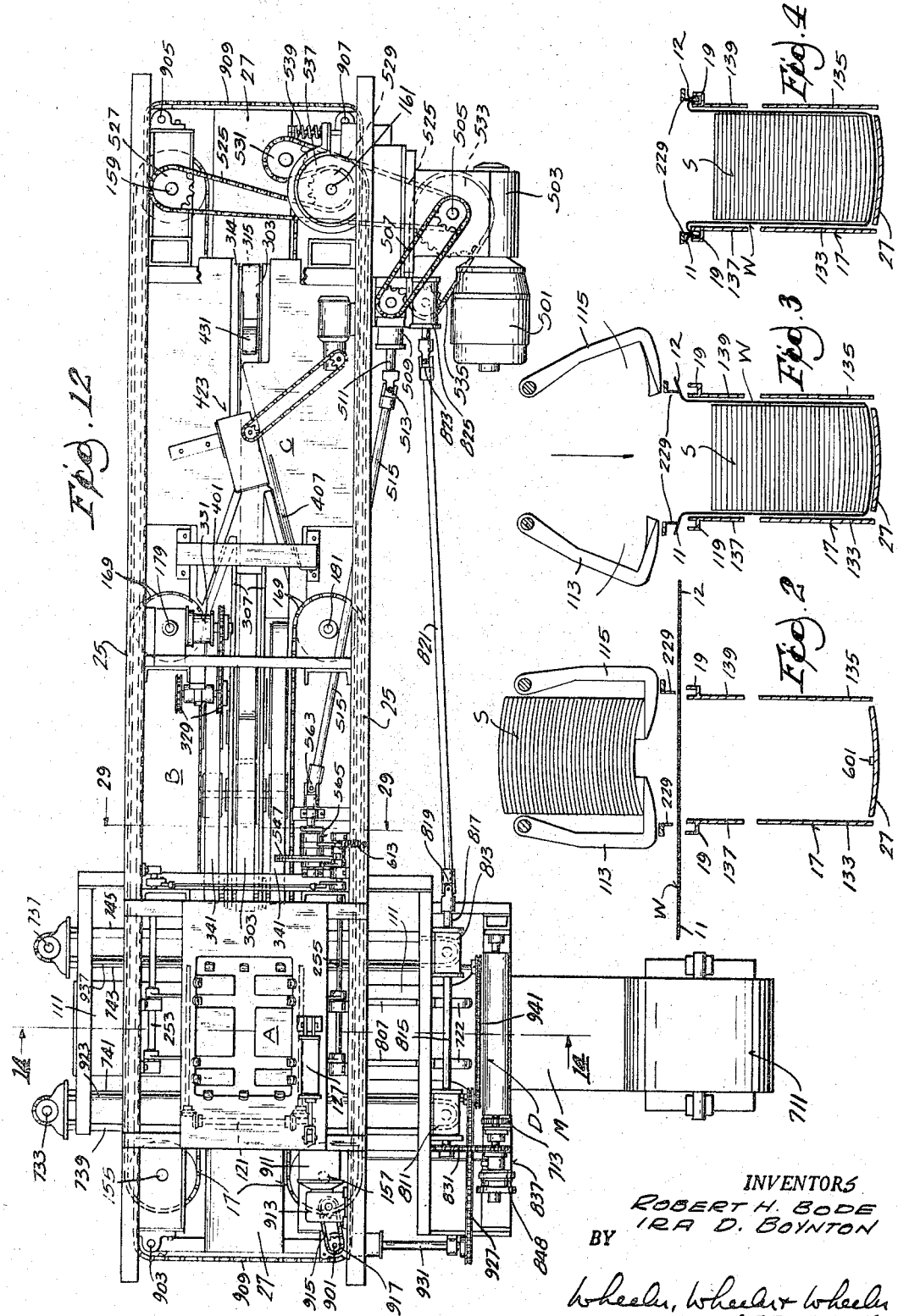

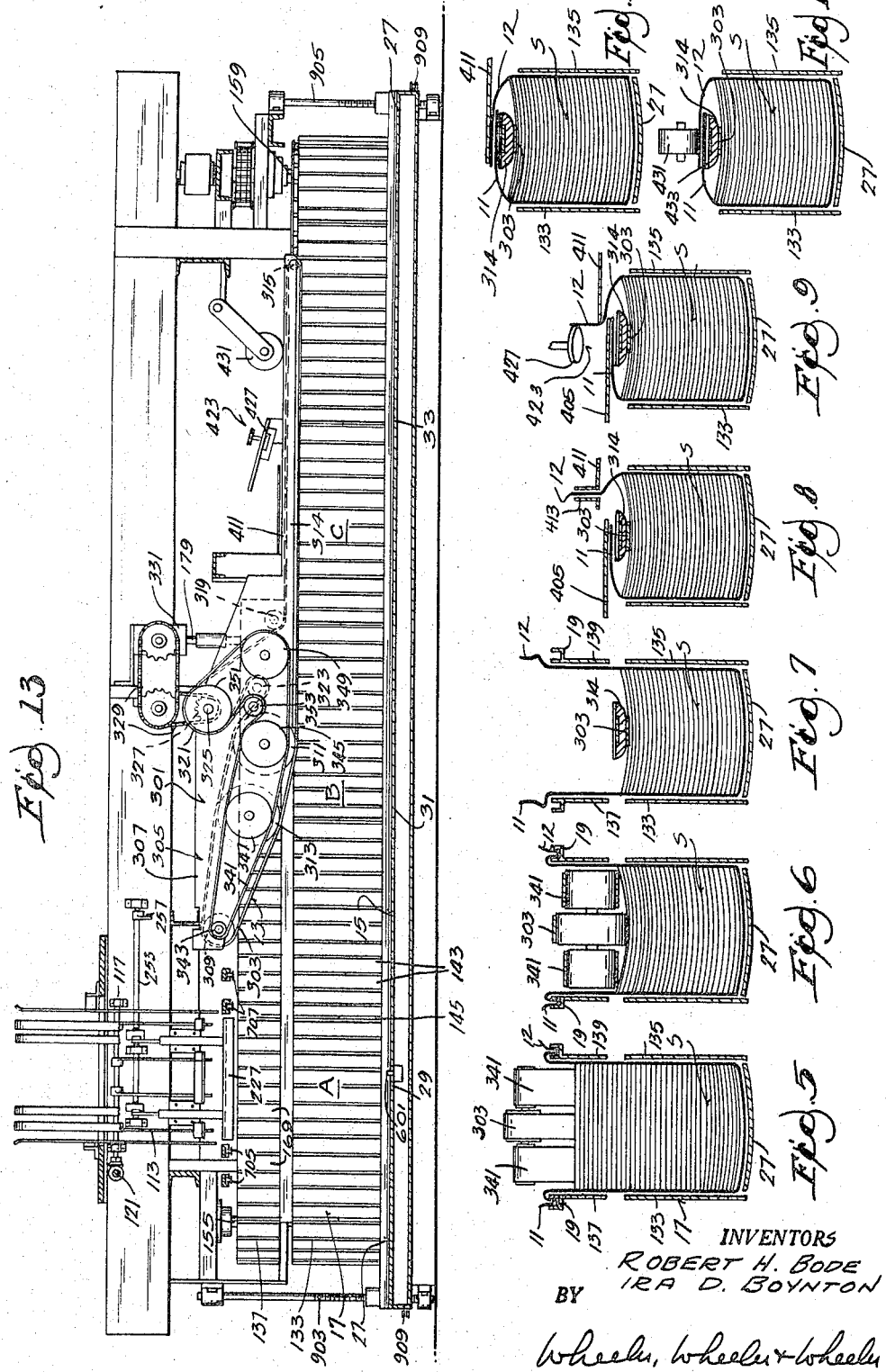

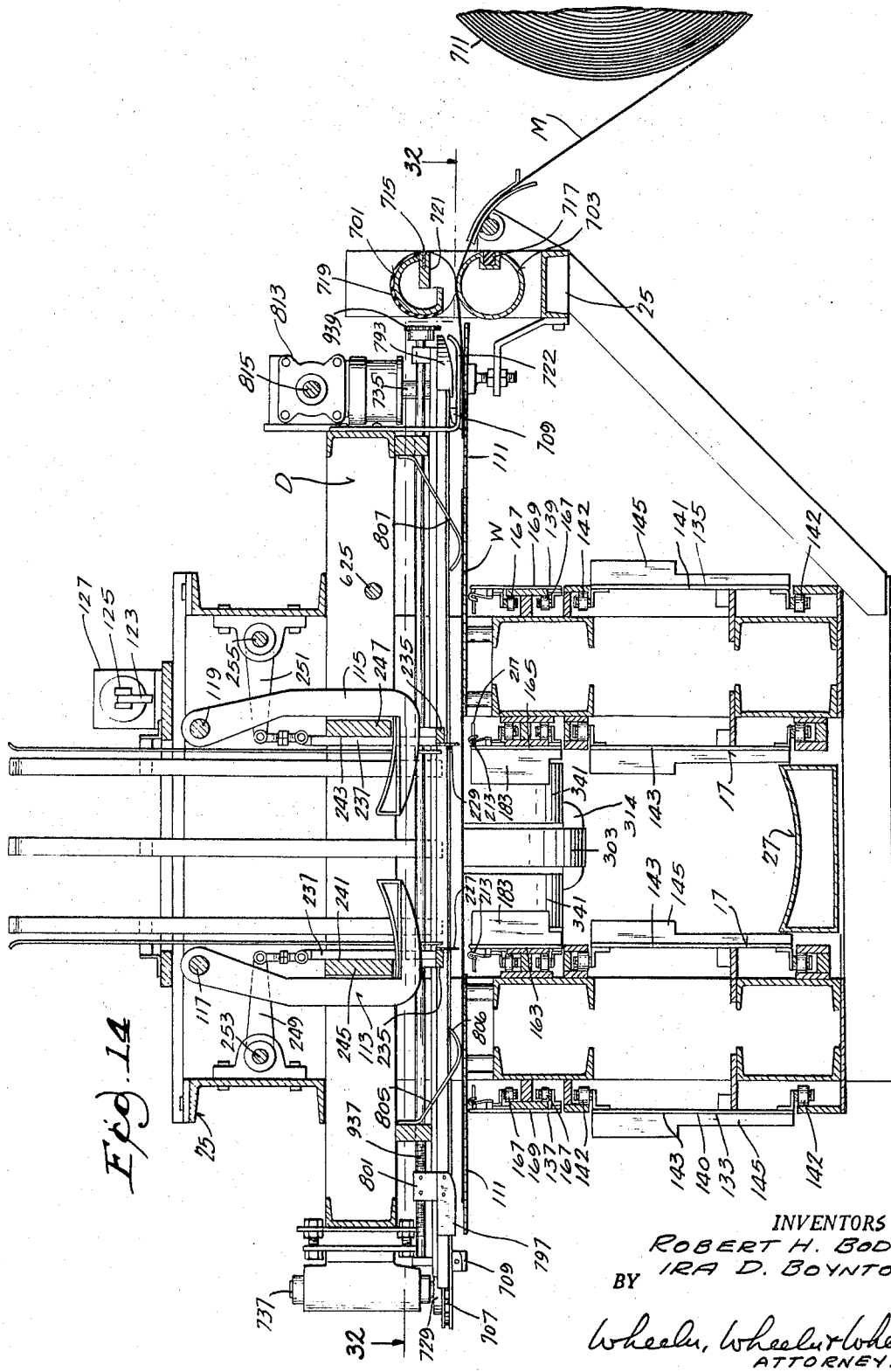

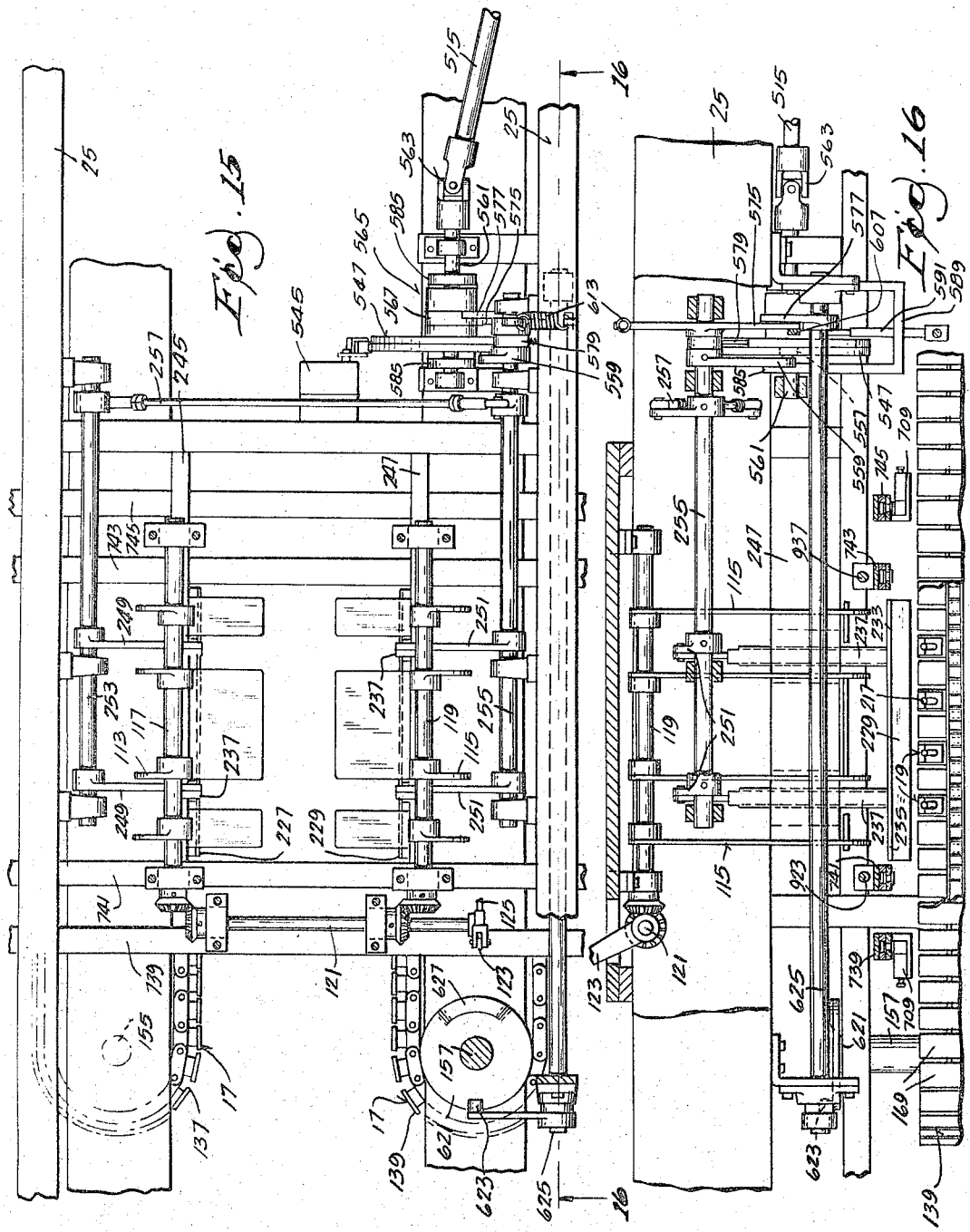

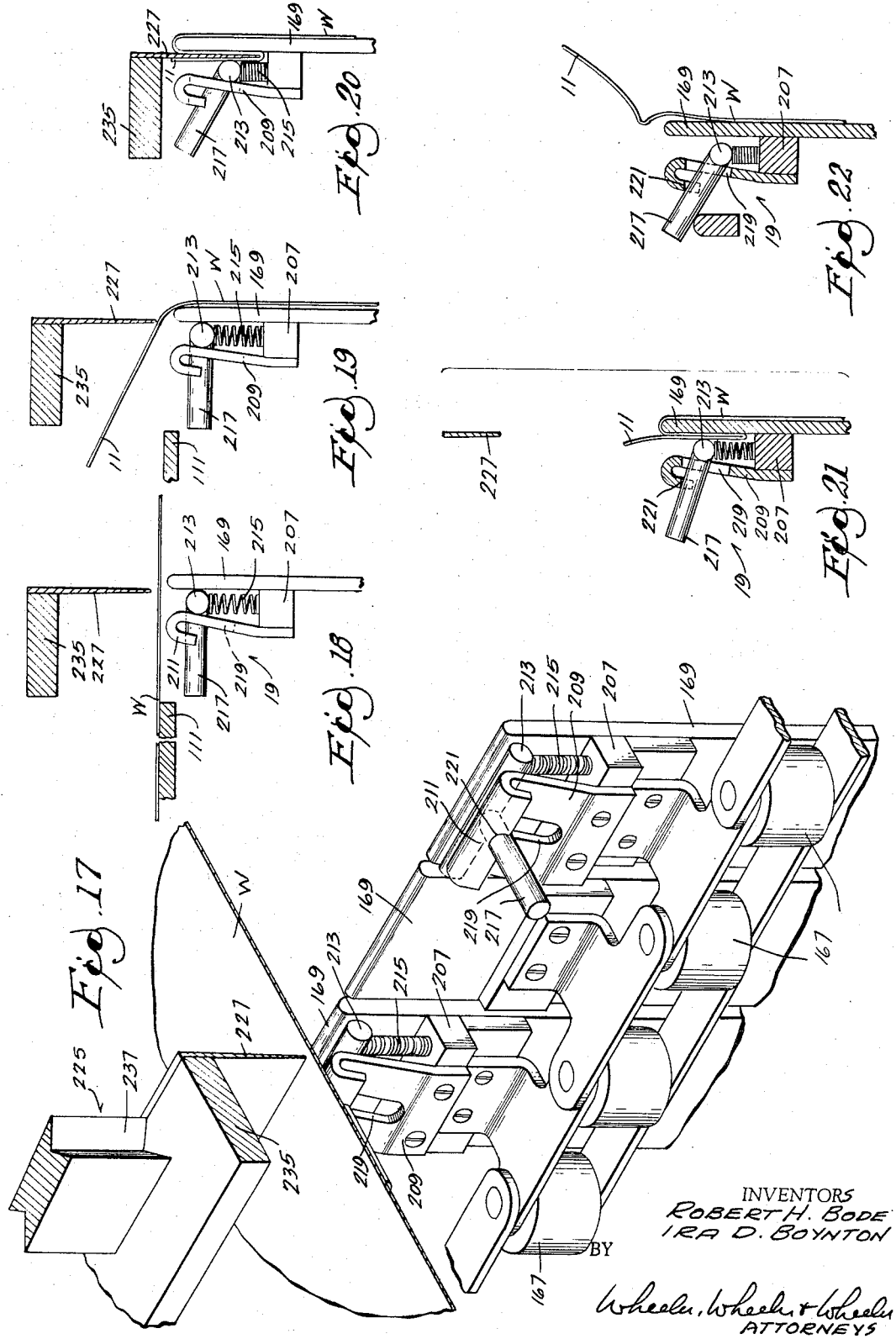

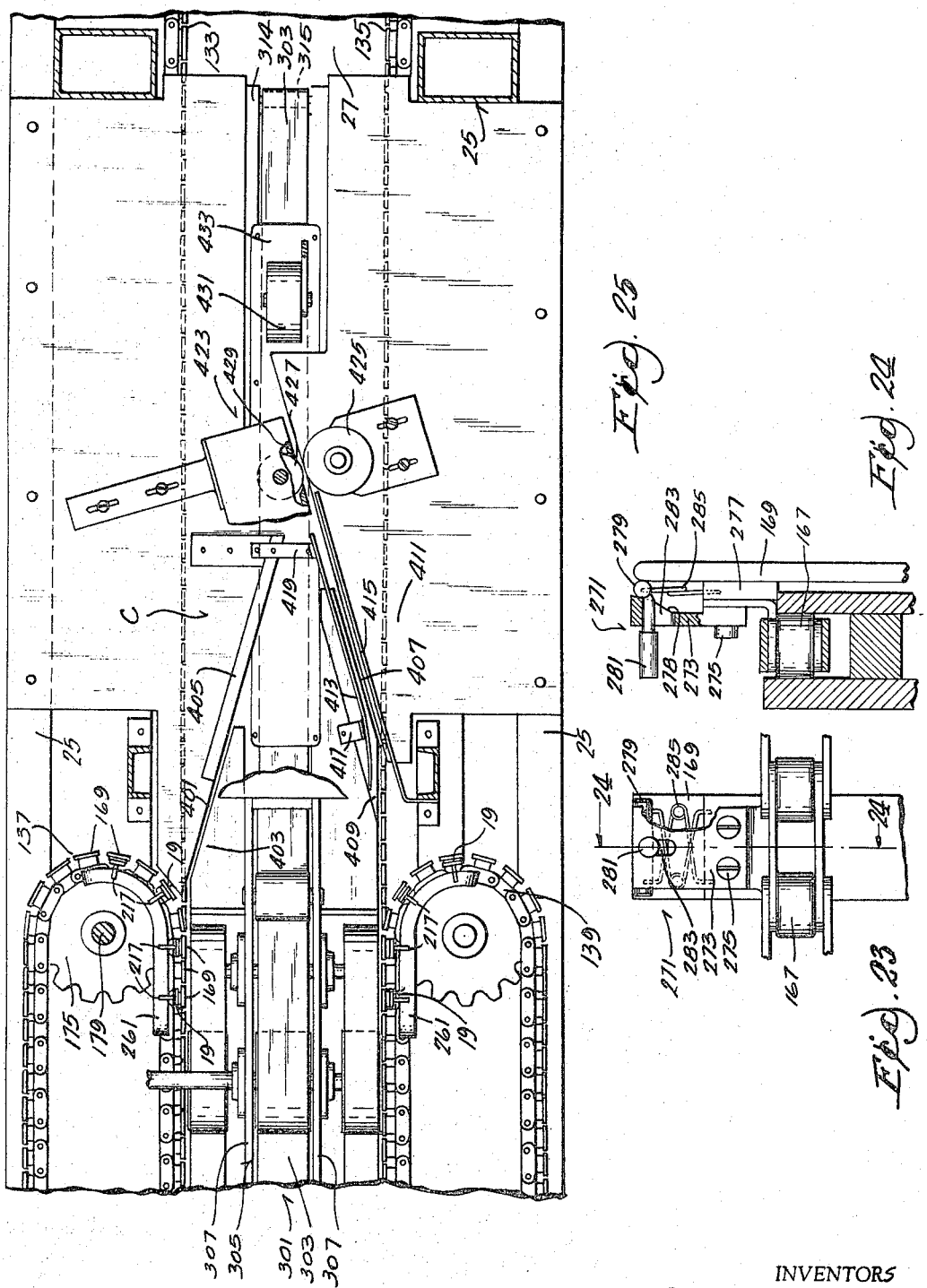

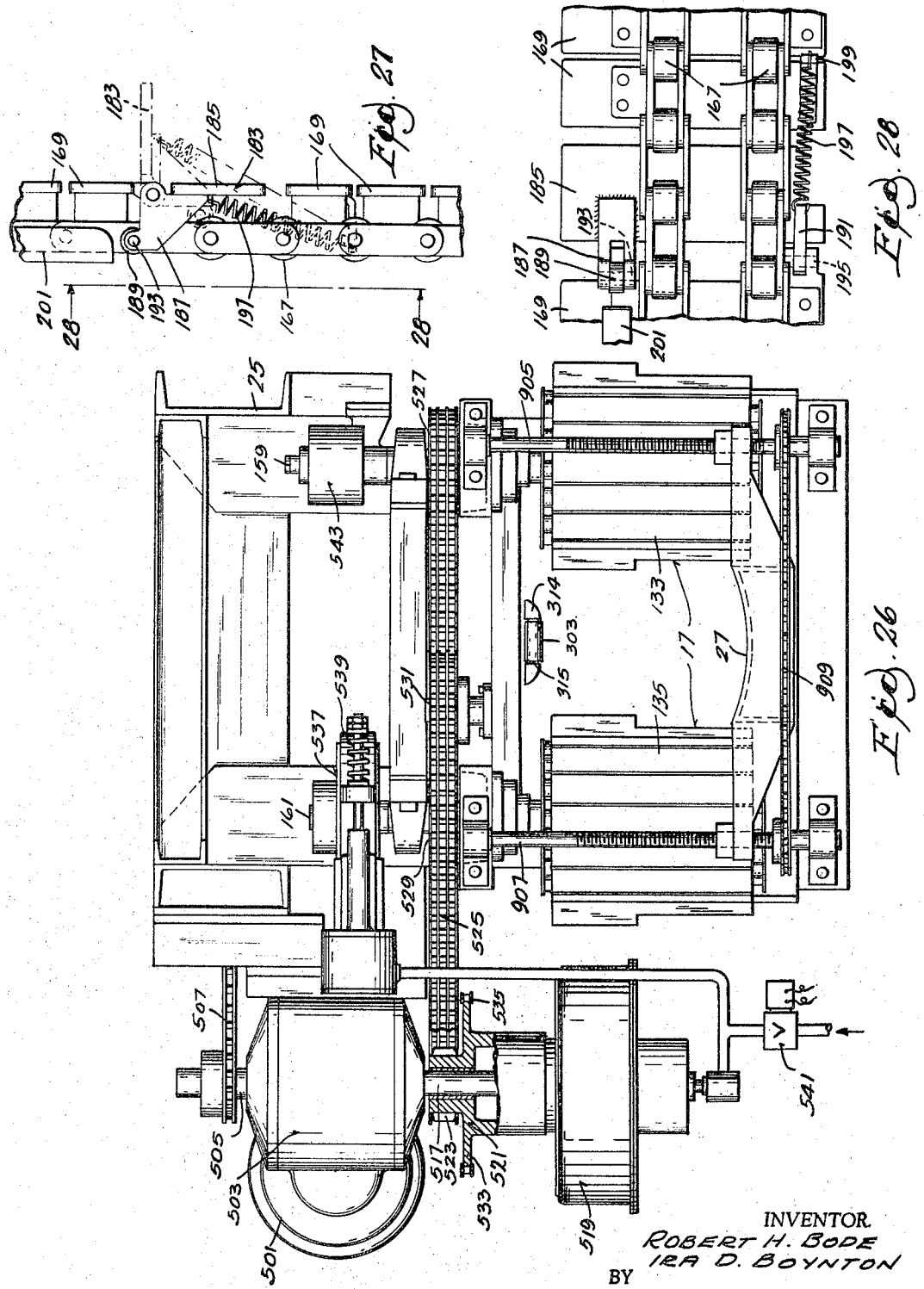

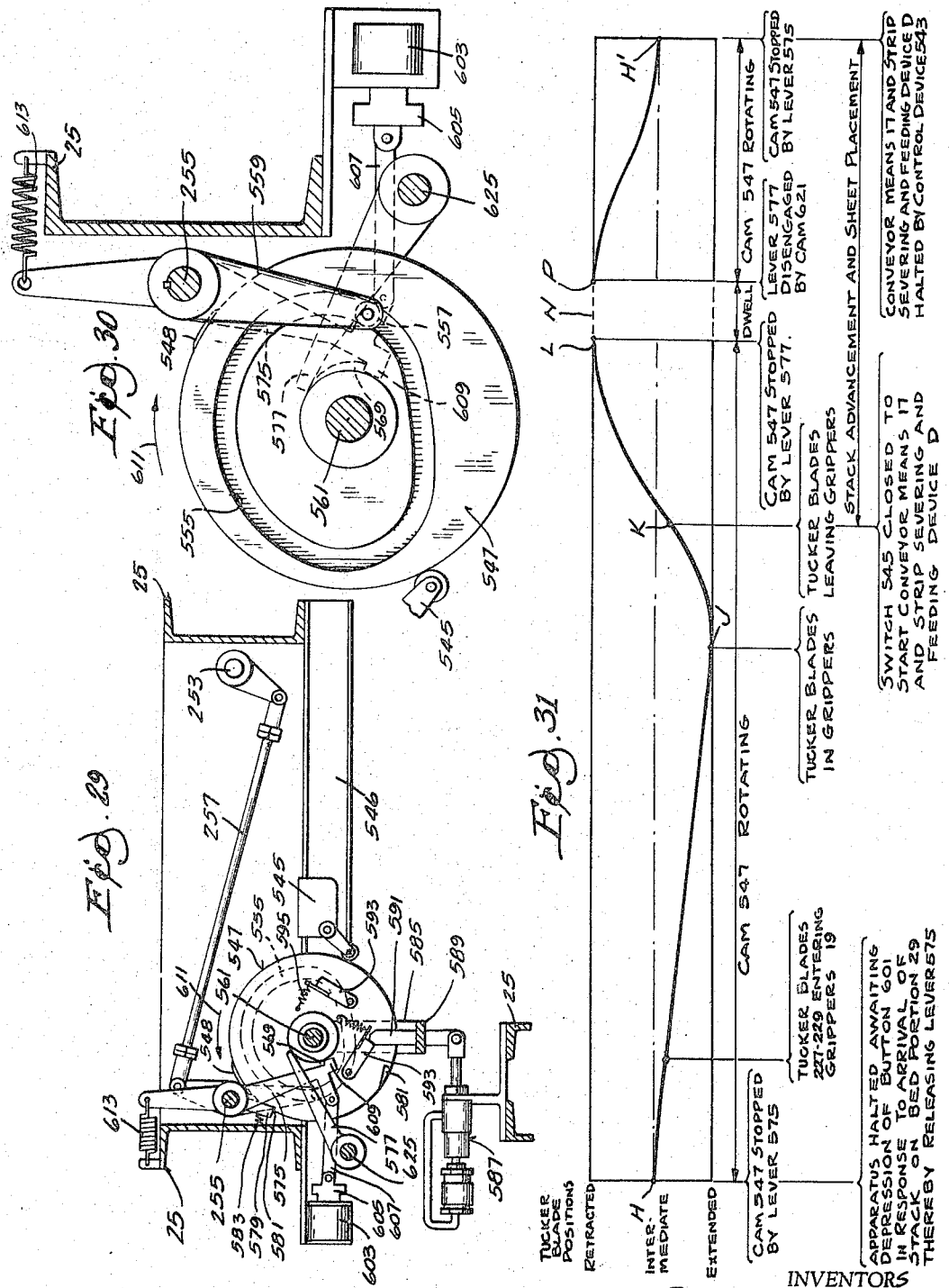

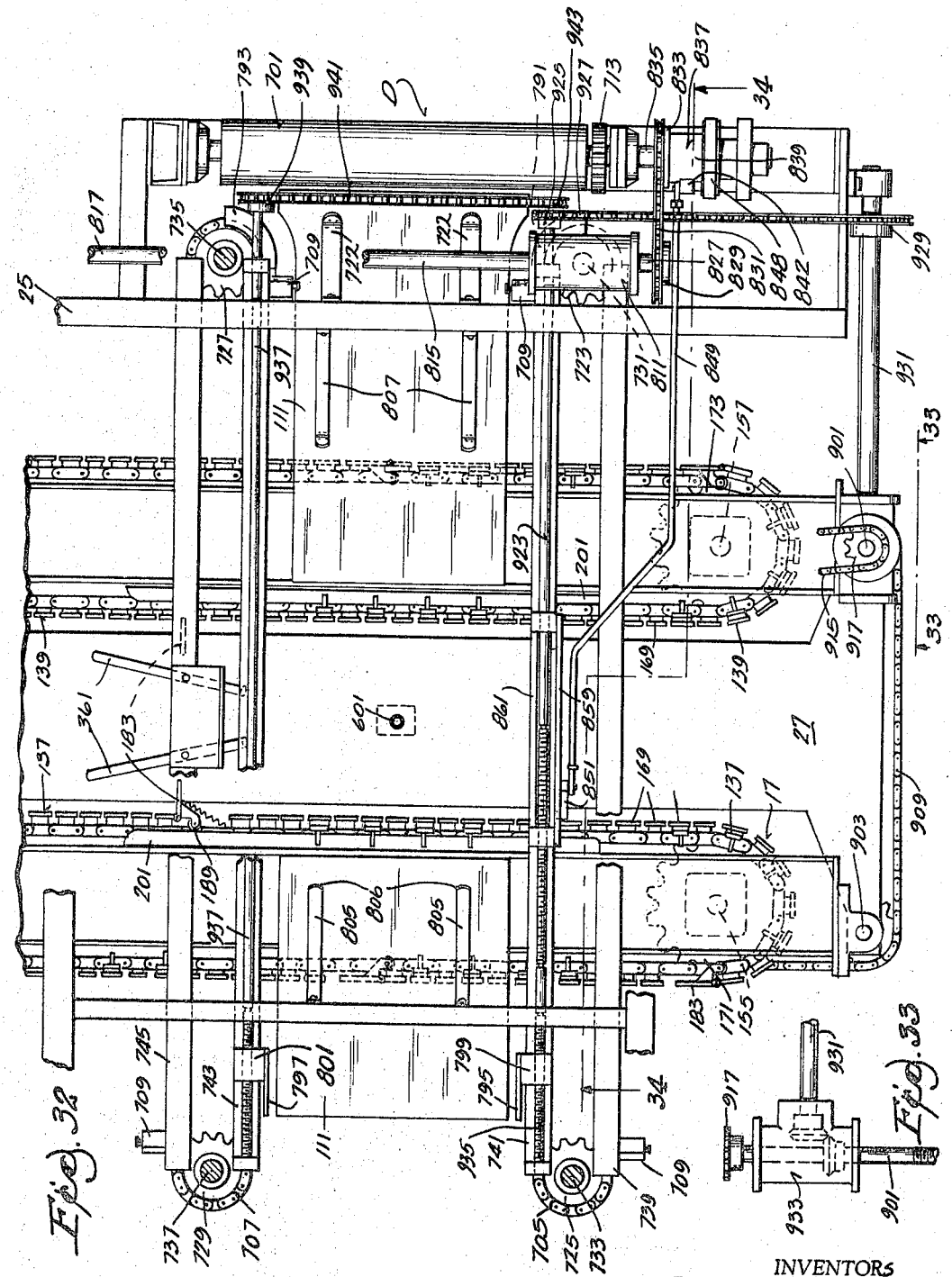

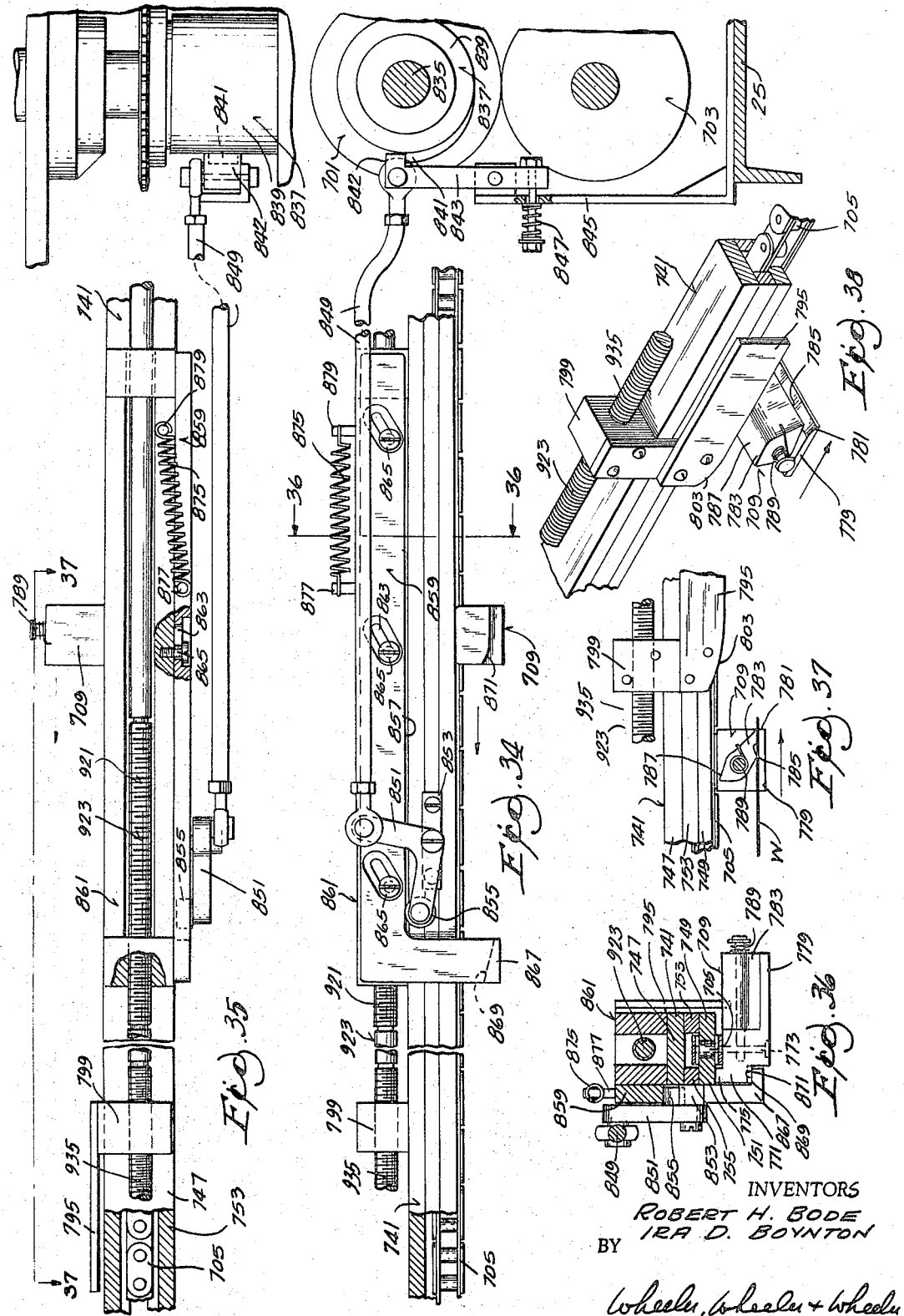

United States Patent Office 3,343,334
Patented Sept. 26, 1967

3,343,334
METHOD AND APPARATUS FOF BUNDLING STACKED MATERIAL
Robert H. Bode, Wenham, and Ira D. Boynton, Lexington, Mass., assignors, by mesne assignments, to The Journal Company, Milwaukee, Wis., a corporation of Wisconsin
Filed Feb. 28, 1963, Ser. No. 261,717
32 Claims. (Cl. 53—124)

The invention relates generally to methods and apparatus for feeding webs of wrapping material and severing individual sheets therefrom, delivering and compressing on such sheets bundles of stacked materials, such as newspapers, and thereupon wrapping the compressed bundles in respective sheets.

The invention provides a stack bundling method and apparatus wherein a stack, partially enclosed in a wrapper sheet, is compressed by passage between a pair of convergent surfaces. The invention also provides for retaining the partially enclosing wrapper sheet, during stack compression, against movement in the direction of compression, thereby preventing crumpling of the wrapper sheet and facilitating subsequent completion of the wrapping of the stack.

In the preferred embodiment, a partially wrapped stack is transported along a supporting bed by a pair of parallel conveyers disposed to provide upright walls at the sides of the bed. The stack is compressed by passage between the bed and an endless belt or member which travels along a path or run disposed between the conveyers and in convergent relation to the bed. Provision is also made for relative adjustment according to the height of the stack. In addition, the preferred embodiment includes gripping devices which are transported in accordance with movement of the stack and which grip the end portions of the wrapper sheet to transport the wrapper sheet with the stack and to prevent crumpling of the wrapper sheet along the engaged sides of the stack during stack compression.

The invention further provides stack bundling apparatus including a wrapper material strip severing and feeding device which, in co-ordination with other operating components, functions to deliver individual sheets of wrapping material in position for engagement around three serially extending sides of a stack during the initial stack wrapping operation. In the preferred embodiment, the strip severing and feeding device includes a pair of rollers which serve to sever the strip into sheets and which additionally function to subsequently advance the strip from the rollers through a predetermined distance. The strip is then gripped for further advancement by strip advancing fingers which also serve, during one portion of the subsequent strip advancement, to actuate the rollers for their next severing and feeding operation.

Still further, the invention provides apparatus adapted for handling stacks of various heights. In this connection, coordinated means are provided for adjustably varying the distance between the convergent surfaces, for adjustably varying the occurrence of roller operation to thereby determine the length of the wrapper sheets, and for adjustably varying the delivery of wrapper sheets to the apparatus so as to uniformly position the wrapper sheets in given relation to the apparatus, notwithstanding variation in sheet length.

Other objects and advantages of the invention will become known by reference to the following description and the accompanying drawings of one embodiment of the invention.

*The drawings*

FIGURES 2 through 11 are diagrammatic sectional views showing progressive operations in the stack bundling method disclosed herein;

FIGURE 12 is a plan view of the apparatus shown in FIGURE 1;

FIGURE 13 is a broken away and partially sectioned elevational view of the apparatus shown in FIGURE 12;

FIGURE 14 is an enlarged, sectional view taken generally along line 14—14 of FIGURE 12;

FIGURE 15 is an enlarged, partial plan view of the stack receiving and wrapping station included in the apparatus shown in FIGURES 12 and 13;

FIGURE 16 is a fragmentary elevational view, partially broken away and in section, taken generally along line 16—16 of FIGURE 15;

FIGURE 17 is an enlarged perspective view of portions of one of the auxiliary conveyers and of the tucker mechanism;

FIGURES 18 through 22 are diagrammatic views illustrating the operation of the sheet gripping devices carried by the auxiliary conveyers;

FIGURE 23 is a partially broken away, elevational view of another embodiment of the sheet gripping device;

FIGURE 24 is a partially broken away sectioned elevational view taken generally along line 24—24 of FIGURE 23;

FIGURE 25 is an enlarged, fragmentary plan view of the apparatus shown in FIGURES 12 and 13, particularly illustrating portions of the stack compressing station and the wrapper folding and gluing station;

FIGURE 26 is an enlarged, elevational view, partially broken away and in section, of the discharge end of the apparatus shown in FIGURES 12 and 13;

FIGURE 27 is an enlarged, fragmentary plan view illustrating the stack pusher bars carried by the auxiliary conveyers;

FIGURE 28 is a fragmentary elevational view taken generally along line 28—28 of FIGURE 27;

FIGURE 29 is an enlarged, fragmentary sectional view taken generally along line 29—29 of FIGURE 12;

FIGURE 30 is an enlarged, reversed view of certain of the components shown in FIGURE 29;

FIGURE 31 is a diagrammatic presentation of the operating cycle of the apparatus shown in FIGURES 12 and 13;

FIGURE 32 is an enlarged and partially broken away, fragmentary plan view taken generally along line 32—32 of FIGURE 14, with the operating components shown in their temporarily halted position awaiting the receipt of another stack;

FIGURE 33 is an enlarged, fragmentary elevational view taken generally along line 33—33 of FIGURE 32;

FIGURE 34 is an enlarged, fragmentary elevational view taken generally along line 34—34 of FIGURE 32;

FIGURE 35 is a partially broken away and sectioned fragmentary plan view of the mechanism shown in FIGURE 34;

FIGURE 36 is a sectional view taken generally along line 36—36 of FIGURE 34;

FIGURE 37 is a fragmentary, elevational view taken generally along line 37—37 of FIGURE 32; and FIGURE 38 is a fragmentary perspective view showing the operation of the mechanism shown in FIGURE 37.

*General description*

Figure 1:
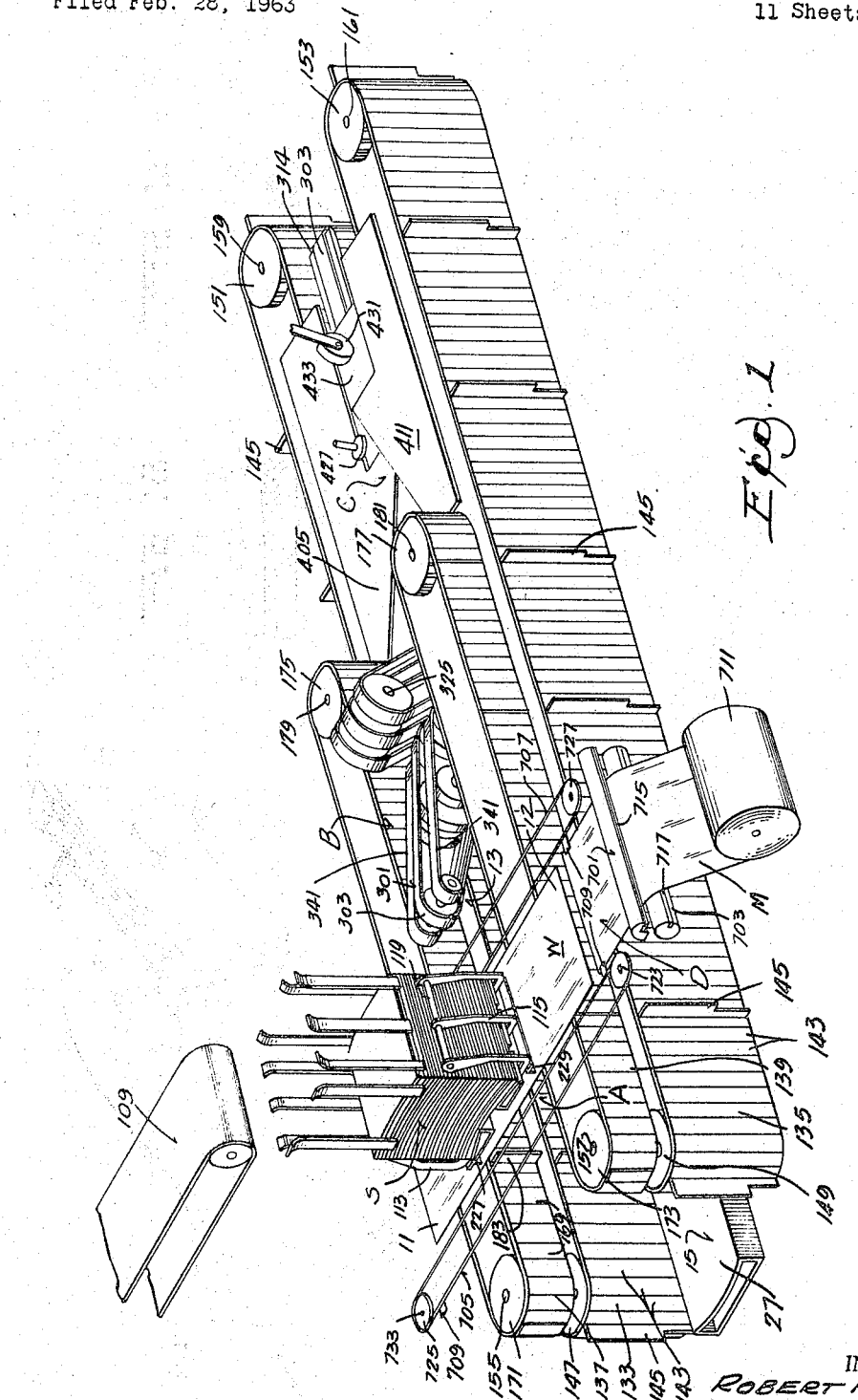
FIGURE 1 is a diagrammatic perspective view of an apparatus embodying various of the features of the invention.

The apparatus shown in the drawings is adapted for bundling or wrapping a bundle or stack S of newspapers, or other stacks of similar material, which are compressible in one direction. The illustrated stack wrapping apparatus includes, in part, means located at a stack receiving and wrapping chamber or station A (see FIGURE 1) for initially folding a wrapper sheet W in engagement with the three serially extending sides of the stack S (see FIGURES 2, 3, and 4) with end portions 11 and 12 of the wrapper sheet W extending outwardly from the stack S. The apparatus further includes means located at a stack compressing station B (see FIGURE 1) for compressing the stack S (see FIGURES 5 and 6) and including (see FIGURE 13) a pair of convergent surfaces 13 and 15 and a conveyer mechanism or means 17 for transporting the stack S and the engaged wrapper sheet W for passage of the stack between the convergent surfaces 13 and 15 to effect compression thereof. Such compression or reduction in height is accomplished without accompanying displacement or crumpling of the portions of the wrapper sheet W engaged with the opposing sides of the stack S. Avoidance of crumping is achieved by holding the sheet tensioned by wrapper sheet-gripping means in the forms of clamping devices or grippers 19 shown in FIGURES 2 through 7 and in FIGURES 17 through 21.

Still further, the apparatus includes means located at a wrapper sheet folding and gluing station C (see FIGURE 1) for folding the free end portions 11 and 12 of the wrapper sheet W over a fourth face or side of the stack S, and into mutual engagement with each other, and for uniting such end portions 11 and 12 while the stack S is maintained in a compressed condition. In the disclosed embodiment, the conveyer mechanism 17 is also employed to transport the wrapper engaged stack S from the stack-receiving and wrapping station A past the wrapper-folding and gluing station C.

Still further, the apparatus includes a device D (see FIGURE 1) for successively severing a strip or web of wrapping material M into the sheets W and for successively feeding the wrapper sheets W into centered position with respect to the stack-receiving and wrapping station A, wherein the wrapper sheet W is folded about the bottom and two sides of the stack S. A coordinated drive and control means is also included.

The apparatus further includes means for adjusting various of the components to accommodate operation with stacks of different heights. More specifically, such means includes coordinated means for adjusting the distance between the convergent surfaces 13 and 15 (see FIGURE 13) in accordance with stack height and means for adjusting the operation of the strip or sheet severing and feeding device D to vary the length of the wrapper sheet W in accordance with stack height and to afford centering of the wrapper sheets relative to the stack-receiving and wrapping station A, notwithstanding such variation in wrapper sheet length which is provided to accommodate varying stack height.

Considering the illustrated construction in greater detail, the apparatus generally includes a suitably constructed, supporting frame 25 (see FIGURES 12 and 13). Mounted on the frame 25 is a horizontally extending elongated bed 27 which serves as a support for the stack S and which can be flat or upwardly concave in cross section, as shown in FIGURE 14. The bed includes, as seen best in FIGURE 13, a first portion 29 which forms a part of the stack-receiving and wrapping station A, a second portion 31 which extends through the stack compressing station B and forms the convergent surface 15 of the stack compressing means, and a third portion 33 which extends through the wrapper folding and gluing station C.

*Stack-receiving and wrapping station*

The means for initially folding the wrapper sheet W around three sides of the stack S comprises, in general, support means for the wrapper sheet including an opening having a pair of transversely spaced edges, means for receiving the stack to be wrapped and for subsequently depositing the stack on the wrapper sheet for passage of the wrapper sheet and stack through the opening, and a receptacle for receiving the stack and wrapper sheet, which receptacle includes a bottom wall and a pair of stack-confining side walls preferably extending to adjacent the side edges of the opening. It is broadly immaterial to the disclosed invention whether the stack material is supplied manually or automatically to the stack-receiving and depositing means or whether the stack material is supplied as a stack or in individual units until a stack is formed. In the illustrated embodiment, as shown in FIGURE 1, a conveyer 109 for supplying the stack material to the stack-receiving and depositing means is provided.

In the illustrated embodiment, the wrapper sheet support means takes the form of a platform 111 including a pair of spaced tables which are suitably supported by the frame in elevated, transversely extending relation to the bed 27.

The stack-receiving and depositing means comprises a pair of opposed dump gates or tongs 113 and 115 (see FIGURES 1, 2, 4, and 14) which are mounted on a superstructure portion of the frame for movement to and from a stack-holding position shown in FIGURES 1, 2, and 14. Incident to movement away from the stack-holding position, the stack S is dropped onto the wrapper sheet W to effect passage of the stack and wrapper sheet through the platform opening.

As shown, the dump gates 113 and 115 are each of L shape and, as seen best in FIGURE 15, are respectively fixed to rock shafts 117 and 119, which shafts are concurrently operated by gear connections at their ends with a cross shaft 121 suitably journaled on a superstructure frame portion. The cross shaft 121 has a crank 123 (see FIGURE 16) fixed thereto, which crank, in turn, is connected to the plunger 125 (see FIGURES 12 and 15) of an actuating device 127 (see FIGURES 12 and 14), such as a solenoid or an air cylinder. The actuating device 127 can be manually controlled or can be interlocked with the control of a stacker (not shown) and the conveyer 109 to provide for stack dropping operation of the dump gates 113 and 115 only after receipt of a complete stack in the dump gates and only when the previously dropped stack has been removed from the stack-receiving and wrapping Station A and the apparatus is in condition for the receipt of another stack.

With respect to the stack-receiving receptacle, the bottom wall is provided by the first portion 29 of the bed 27 and the stack-confining side walls are provided by a pair of opposing conveyer runs forming portions of the stack conveying means 17. The stack conveying means 17 or conveyer mechanism 17 includes (see FIGURES 1 through 11, and 14) an opposed pair of main or side wall conveyers 133 and 135 which extend for generally the length of the bed 27 and an opposed pair of auxiliary or wrapper sheet transporting conveyers 137 and 139 which are respectively disposed about the main conveyers 133 and 135 and extend for only a part of the bed length, terminating in an area adjacent to the stack compressing station B.

Still more specifically, the main conveyers 133 and 135 respectively include endless members 140 and 141 disposed to provide a pair of opposed, parallel runs adjacent to the sides of the bed 27. In the illustrated embodiment, each endless member comprises a pair of vertically spaced link chains 142 (see FIGURE 14) interconnected by a series of vertically extending slats or plates 143 (see FIGURES 1 and 13). Connected to certain of the slats 143 in evenly spaced relation to one another are a series of vertically extending pushing bars 145 which are adapted to engage the rearward edge or face of the stack S to assist in advancement of the stack along the bed 27 from the stack-receiving and wrapping station A toward the discharge end of the apparatus.

The endless members 140 and 141 are respectively trained around sprockets 147 and 149 at the supply end of the apparatus and around sprockets 151 and 153 at the discharge end of the apparatus. The sprockets 147, 149, 151, and 153 are carried by respective shafts 155, 157, 159, and 161, suitably supported by the frame 25.

The auxiliary conveyers 137 and 139 respectively include endless members 163 and 165 each of which, in the disclosed embodiment, comprises a pair of vertically spaced link chains 167 (see FIGURE 14) supporting a series of vertically extending slats or plates 169. The endless members 163 and 165 are respectively trained about sprockets 171 and 173 at the supply end of the apparatus. The sprockets 171 and 173 are respectively mounted on the before-mentioned sprocket shafts 155 and 157. Accordingly, the endless members 163 and 165 of the auxiliary conveyers advance at the same rate as the endless members 140 and 141 of the lower or main conveyers. Toward the discharge end of the apparatus, the endless members 163 and 165 are trained about respective sprockets 175 and 177 carried respectively on stub shafts 179 and 181 suitably mounted on the frame 25. The slats 169 extend vertically from adjacent the slats 143 of the main conveyers 133 and 135 to a level adjacent to the platform 111, thereby providing folding means in the form of the top edge of the stack-confining walls, about which edge the wrapper sheet W is drawn during passage of the stack S into the stack-receiving and wrapping station A.

The auxiliary conveyers 137 and 139 further include pusher bars 183, seen best in FIGURES 27 and 28, which pusher bars are mounted on certain of the slats 169 in spaced relation to each other at distances corresponding to the spaced relation of the stack pushing bars 145 of the main or side wall conveyers 133 and 135 and which are adapted to engage the rearward face of the stack to assist in propelling the stack prior to compression thereof. Such engagement also assists in transporting the wrapper sheet with the stack. However, in order to prevent interference of the pusher bars 183 with components of the stack compressing means, means are provided for pivotally connecting the pusher bars 183 to the link chains 167, for biasing the pusher bars 183 to a retracted condition in generally co-planar relation with the adjacent slats 169, and for camming the pusher bars 183 into their stack engaging positions during travel past the stack-receiving and wrapping station A and toward the stack compressing station B.

More particularly, the pusher bars 183 each comprise a bar portion 185 and a bracket portion 187 which extends from the upper part of the bar portion and which supports a cam follower in the form of a roller 189. Extending from the lower part of the bar portion 185 is a lug 191. Between the bar portion 185 and the roller 189, the pusher bar 183 is pivoted to the preceding slat 169 by upper and lower hinge pins 193 and 195.

The pusher bars 183 are each biased into retracted position in generally co-planar relation with the adjacent slats 169 by spring means 197 anchored, at one end, to the lug 191 at a point in spaced relation to the hinge pin 195. At its other end, the spring means 197 is anchored to a lug 199 projecting from one of the adjacently following slats 169.

Mounted on the frame 25 on each side of the apparatus, as seen in FIGURE 32 as well as in FIGURES 27 and 28, in position for engagement by the rollers 189 are cams 201, which cams are each formed to effect movement of the pusher bars 183 to their outwardly extending, stack engaging positions during movement of the auxiliary conveyers from a point prior to the stack-receiving and wrapping station A to a point immediately in advance of the stack compressing station B.

In addition to such advance of the wrapper sheet W as is obtained by reason of frictional engagement of the wrapper sheet between the stack S and the slats 143 and 169, advancement of the wrapper sheet with the stack is also obtained by means which, in the disclosed embodiment, are provided by the grippers 19 which are carried on, and adjacent to, the top edges of the slats 169 of the auxiliary conveyers 137 and 139. The grippers also serve to prevent vertical or crumpling movement of the wrapper sheet relative to the conveyer slats during stack compression.

Each of the grippers 19 comprises, as seen best in FIGURE 17, a block or spacer 207 which is fixed to the back face of the associated slat 169 in spaced relation to the upper end thereof. Fixed to the spacer 207 is a bracket including an upwardly projecting leg 209 which extends in inclined relation toward the top edge of the associated slat and a portion 211 which extends from the upper end of the leg 209 in outwardly rebent relation from the slat 169. Within the cavity thus formed is a cylindrical locking bar 213 which is urged upwardly by one or more springs 215. In order to prevent expulsion of the locking bar 213 from the cavity by action of the springs 215, the cross-sectional dimension of the locking bar is greater than the distance between the back face of the associated slat 169 and the upper end of the leg 209.

Extending from each locking bar 213 is a handle 217 which passes through a vertically extending slot 219 in the bracket leg 209 and which is engaged in a notch 221 on the bottom edge of the rebent portion 211. The notch 221 serves as a fulcrum about which the locking bar 213 is shiftable.

Prior to advancement of the stack S and the wrapper sheet W from the stack-receiving and wrapping station, the end portions 11 and 12 of the wrapper sheet are inserted in the grippers 19 by a tucker mechanism 225 (see FIGURES 14, 15, and 16, in addition to FIGURE 17). As will be seen, the tucker mechanism 225 also serves to guide travel of the wrapper sheet W as it is drawn over the top edges of the auxiliary conveyer slats 169, thereby assuring disposition of the wrapper sheet end portions 11 and 12 in overlying relation to the grippers 19 after engagement of the wrapper sheet W around the bottom and the opposing sides of the stack S.

More specifically, the tucker mechanism 225 includes a pair of vertically shiftable tucker blades 227 and 229, one on each side of the apparatus. The tucker blades 227 and 229 are relatively thin members which depend respectively from subframes 231 and 233, each subframe including a bridge member 235 and a pair of spaced uprights 237. The uprights 237 of the respective subframes 231 and 233 are guided for vertical motion in respective guideways 241 and 243 (see FIGURE 14) provided in respective frame members 245 and 247 suitably supported by the frame 25. The subframes 231 and 233 are pivotally connected at the end of the uprights 237, through lost motion connections to respective cranks 249 and 251. In turn, the cranks are mounted on respective rock shafts 253 and 255 suitably supported by the frame. The rock shafts 253 and 255 are connected, to obtain concurrent operation thereof to cause common vertical movement of the tucker blades 227 and 229, by a linkage 257 (see FIGURE 15).

The tucker blades 227 and 229 are movable to relatively elevated, retracted positions, as shown in FIGURES 21 and 22, above the sheet supporting platform 111 to permit sheet advancing action of the sheet severing and feeding device D thereunder, to intermediate positions, as shown in FIGURES 17, 18, and 19, in adjacently spaced relation above the top edges of the auxiliary conveyer slats 169 to control and guide the passage of the sheet over the top edges of the slats 169 so that the end portions 11 and 12 of the wrapper sheet S extend over the grippers 19, and to extended positions, as shown in FIGURE 20, within the grippers 19 below the platform 111, whereby, in response to movement of the tucker blades into the grippers after dumping of a stack S onto the bed 27, the end portions 11 and 12 of the wrapper sheet S are tucked into the grippers 19.

The wrapper sheet end portions 11 and 12 are released from the grippers 19 subsequent to compression of the stack S and prior to folding the wrapper sheet end portions 11 and 12 over the top of the stack. In this regard, on each side of the frame 25 adjacent to the discharge end of the auxiliary conveyers 137 and 139, there is mounted, as seen best in FIGURE 25, a camming bar 261 which, incident to passage of the grippers 19, engages the handles 217 to rock the handles upwardly about the fulcrum notches 221, thereby shifting the locking bar 213 downwardly to release the frictional engagement of the locking bar with the wrapper sheet.

Shown in FIGURES 23 and 24 is a sheet gripper 271 of modified construction. More particularly, the sheet gripper 271 includes a bracket 273 which is attached by means including a bolt 275 and a spacer 277 to the upper end of the back face of one of the auxiliary conveyer slats 169. At its upper end, the bracket includes a surface 278 which is inclined upwardly toward the upper edge of the associated slat 169. Located in the cavity or receptacle thus formed is a clamping or locking bar 279 having a handle or follower 281 extending through a vertical slot 283 in the bracket 273. Also provided are spring means 285 for urging the locking bar 279 upwardly so as to cause the locking bar to bear against the back face of the slot. The operation of the gripper 271 is substantially like that of the grippers 19, differing only in that the locking bar is displaced downwardly as a whole during sheet releasing action, rather than pivoting about a fulcrum, as does the locking bar 213 of the sheet gripper 19.

*Stack compressing station*

As already mentioned, the stack compressing station B includes the pair of convergent surfaces 13 and 15 between which the stack S is transported. In the disclosed embodiment, the bed portion 31 forms the convergent surface 15. The other convergent surface 13 is principally provided by one run of an endless belt mechanism 301, which stack-compressing run is disposed in downwardly inclined relation toward the discharge end of the apparatus.

More specifically, as shown in FIGURE 13, in the disclosed embodiment, the endless belt mechanism 301 includes a main or central endless belt or member 303 which is fixedly supported intermediate the opposed runs of the main and auxiliary conveyors by a subframe 305 generally including a pair of spaced plates 307 which are suitably connected to the frame 25.

The central belt 303 is trained around pulleys 309 and 311, supported by the subframe 305 to establish the stack-compressing run. If desired, an intermediate pulley 313 can be located between the pulleys 309 and 311 to support the belt 303 during compression of the stack and to subdivide the run into two sections, i.e., a first section wherein the stack is initially compressed at a relatively rapid rate and a second section wherein the stack is compressed at a relatively slower rate.

From the pulley 311, the belt 303 extends past the sheet-folding and gluing station C on the underside of a horn 314 which is supported by the subframe 305 and extends in parallel relation to the bed 27 between the main conveyers 133 and 135. At the rear of the horn 314, the belt 303 is trained around an idler pulley 315 supported by the horn 314. From the idler pulley 315, the belt 303 extends toward the supply end of the apparatus in a recess in the top of the horn 314, to another idler pulley 319 supported by the subframe 305 in advance of the sheet-folding and gluing station C. From the idler pulley 319, the belt is trained around a drive pulley 321, then around another idler pulley 323, supported on the subframe 305, and back to the pulley 309. The drive pulley 321 is carried on a shaft 325 which is journaled on the subframe 305 and supports a sprocket 327 connected by a chain drive 329 to a gear box 331 driven off the sprocket shaft 179 at the end of the auxiliary conveyer shown to the right at the top of FIGURE 12. In the disclosed embodiment, the belt 303 is advanced at the same rate as the advancement of the main and auxiliary conveyors.

While a single central belt of sufficient width will provide satisfactory results, the illustrated embodiment also incorporates, as shown in FIGURES 1, 5, 6, and 12, a side belt 341 at each side of the central belt 303. The belts 341 are each disposed with a stack-compressing run extending in generally parallel and slightly elevated relation to the stack-compressing run of the central belt. More particularly, each of the belts 341 is trained downwardly and toward the discharge end of the apparatus around pulleys 343, 345, and 347 which are respectively mounted on the shafts supporting the pulleys 309, 311, and 313. From the pulleys 345, the side belts 341 extend rearwardly around pulleys 349 which are supported by the subframe 305 in advance of the sheet-folding and gluing station C. From the pulleys 349, the side belts 341 are trained about drive pulleys 351 carried on the drive shaft 325, then around pulleys 353 carried by the subframe 305, and then back to the pulleys 343.

The use of side belts assures compression of the side portions of the stack adjacent to the main or side wall conveyers. The variation in height between the stack-compressing run of the central belt 303 and the stack-compressing runs of the side belts 341 compensates for the cross-sectional curvature of the bed 27 and serves to provide for essentially uniform compression, notwithstanding the curved condition of the stack as a whole.

In order to facilitate initial movement of the stack S under the stack compressing endless belt mechanism, a series of transition bars 361, as shown best in FIGURE 32, can be supported by the subframe 305 at the end thereof adjacent to the stack-receiving and wrapping station A.

During the major portion of the passage of the stack S through the stack compression station B, the end portions 11 and 12 of the wrapper sheet W are retained by the grippers 19. However, prior to discharge of the stack S from the compressing station B, the grippers are actuated by the cams 261 (see FIGURE 25) to release the end portions 11 and 12 of the wrapper sheet.

*Wrapper-folding and gluing station*

After passage through the stack compressing station B, the end portions 11 and 12 of the wrapper sheet W are folded over the top face of the stack S and into mutual engagement with each other and united. More specifically, immediately after release of the end portions of the wrapper sheet W from the grippers 19, the end portions 11 and 12 engage folding means for sequentially overlying the wrapper sheet portions 11 and 12 on the top face of the compressed stack S and, at least partially, in superposed condition to each other. The folding means includes a series of sheet metal plates or the like disposed in overlying relation to the bed 27 and in adjacently spaced overlying relation to the horn 314.

More specifically, as seen best in FIGURE 25, the end portion 11 is first folded relative to the stack S incident to passage thereof through a slot 401 which extends at an angle with respect to the direction of stack advancement and from the adjacent to the side conveyer 133 to past the center line of the bed. The slot 401 is defined by a forward plate or leaf 403 supported by the subframe 305 and by a rearward plate or leaf 405 supported by the frame 25.

The other wrapper sheet end portion 12 is folded inwardly over the top of the stack S in response to passage through a channel 407 which extends in converging relation toward the slot 401. The channel 407 is defined by a forwardly disposed plate or leaf 409 supported by the subframe 305 and a rearwardly disposed plate or leaf 411 supported by the frame 25. In order to permit completion of the folding of the end portion 11 into overlying relation to the stack S prior to folding of the margin of the end portion 12 over the margin of the end portion 11, the entrance to the channel 407 is spaced closer to the discharge end of the apparatus as compared to the entrance to the slot 401.

In order to confine the margin of the wrapper sheet end portion 12 in a generally upright position to facilitate the application of glue during progressive folding of the wrapper sheet portion 12 into overlying relation to the stack S, a pair of guides 413 and 415 extend vertically from each side of the channel 407. The guide 413 is supported at the end thereof adjacent to the entrance of the channel 407 on a bracket 417 fixed to the plate 409. At its other end, the guide 413 is fixed to a bracket 419 extending from the leaf 405. The guide 415 is supported on the leaf 411 by suitable means.

The guides 413 and 415 co-operate with a gluing device 423 for applying a ribbon of adhesive or glue to the margin of the wrapper sheet portion 12 immediately prior to the folding of said margin into overlying relation to the margin of the other wrapper sheet portion 11. More specifically, the gluing device 423 is of conventional construction, including a back-up roll 425 disposed tangentially to the guide 415, a glue supply roll 427 which is slightly spaced from the back-up roll 425 to permit passage of the margin of the wrapper sheet portion 12 therebetween, and means for supplying glue to the glue supply roll. As shown, the glue supply roll 427 extends through a wall 429 which, in general, constitutes an extension of the guide 413. The gluing device 423 is mounted on the plates 405 and 411 at an incline which extends downwardly toward the discharge end of the apparatus at an angle facilitating the application of glue along the generally upwardly extending margin of the sheet portion 12 during progressive folding thereof.

After passage of the margin of the wrapper sheet portion 12 between the rolls 425 and 429, thereby supplying glue to the margin of the wrapper sheet portion 12, continued travel of the stack and the engaged wrapper sheet causes complete folding of the margin of the wrapper sheet portion 12 into overlying relation to the margin of the other wrapper sheet portion 11. Thereafter, the overlaid wrapper sheet margins are pressed together incident to passage under a pressure roller 431 which acts through the wrapper sheet margins against a plate 433 supported by the horn 314 in covering relation to the recess in which the belt 303 travels. Continued movement of the now fully wrapped stack effects delivery thereof out of the discharge end of the apparatus, preferably onto a conveyer for transporting the stack to a truck loading platform.

*Drive and control means*

The main conveyors 133 and 135, the auxiliary conveyers 137 and 139, the tucker mechanism 225, and the endless belt mechanism 301 are all driven in co-ordination by drive and control means which, in the illustrated embodiment, includes a motor 501 (see FIGURES 12 and 26) in driving connection with a speed reducer or gear box 503. As will be seen hereinafter, the sheet severing and feeding device D is also driven through the gear box 503 from the motor 501.

Extending upwardly from the gear box 503 is a constantly rotating output shaft 505 which, through a power train (see FIGURE 12), including a sprocket drive 507, gear box 509, output shaft 511, universal coupling 513, and power shaft 515, powers the tucker mechanism 225 and serves to control operation of the apparatus. Coupled to an output shaft 517 (see FIGURE 26) extending through the bottom of the gear box 503 is a conventional, pneumatically operated clutch 519 including a unitary output sprocket wheel 521. The unitary sprocket wheel 521 includes a first sprocket 523 engaged with a chain 525 trained, as shown in FIGURE 12, in an S shape around sprockets 527 and 529 carried respectively by the sprocket shafts 159 and 161 at the discharge end of the main conveyers, and around an idler sprocket 531 mounted on the frame 25.

The unitary sprocket wheel 521 also includes another sprocket 533 (see FIGURE 26) engaged with a power train including a chain drive 535 drivingly connected to the sheet severing and feeding device D. Accordingly, the main and auxiliary conveyers are advanced and the sheet severing and feeding device D operates when the clutch 519 is engaged.

Mounted on the upper end of the sprocket shaft 161 shown in FIGURE 12 at the discharge end of the apparatus is a brake 537 which serves to lock the sprocket shaft 161 against rotation immediately upon disconnection of the clutch 519, thereby preventing continued travel of the main and auxiliary conveyers. Such braking is also transmitted through the chain 525 to prevent continued operation of the sheet severing and feeding device D.

While various types of brakes can be employed, the disclosed brake 537 is biased by a heavy compression spring 539 into braking condition and is pneumatically released. Operation of the brake 537 and clutch 519 are co-ordinated by connecting each through a common valve 541 to a source of pressure air. Accordingly, when the valve 541 is opened, the clutch 519 is engaged and the brake 537 is concurrently released. When the valve 541 is closed, the clutch 519 is disengaged and the brake 537 is simultaneously automatically set by the spring 539. In the disclosed embodiment, the valve 541 is solenoid operated.

Mounted on the sprocket shaft 159 at the discharge end of the apparatus is a control device or actuator 543 (see FIGURES 13 and 26) which is electrically connected to the solenoid valve 541 and which serves to close the valve after a predetermined advance of the main conveyers 133 and 135 and after one cycle of the sheet severing and feeding device D. In the disclosed embodiment, the valve 541 is closed after one complete revolution of the sprocket 159.

Opening of the valve 541 to release the brake 537 and to engage the clutch 519 so as to drive the conveyers and to operate the sheet severing and feeding device D, is obtained by means which, in the disclosed embodiment, takes the form of an electric switch 545 (see FIGURES 15 and 29). The switch 545 is closed to electrically actuate the valve 541 in response to rotation of a cam 547 driven by the tucker mechanism power shaft 515. The switch 545 is carried on a cross frame member 546 (see FIGURE 29) and is operated by a projection 548 on the periphery of the cam 547.

The cam 547 also includes on one face, as shown in FIGURE 30, an internal cam slot 555 engaged by a follower 557 on the end of a crank 559 mounted on the tucker mechanism rock shaft 255 shown at the bottom of FIGURE 15. The cam slot 555 is dimensioned to obtain movement of the tucker blades 227 and 229 in co-ordination with operation of the other components of the overall apparatus as is explained hereinafter.

The cam 547 is carried for rotation on a shaft 561 which is suitably journaled on the frame 25 and which is connected through a universal coupling 563 with the power shaft 515. Coupling the cam 547 to the shaft 561 for rotation by the power shaft 515 is a clutch 565 of conventional construction. Included in the clutch 565 is a hub 567 having a shoulder or stop 569 (see FIGURES 29 and 30) which is engageable by a pair of shiftable pawls or levers 575 and 577 to uncouple the cam 547 from the shaft 561, and consequently, from the power shaft 515. When the levers 575 and 577 are held out of engagement with the stop 569, the cam 547 is driven through the clutch 565 by the power shaft 515.

Means are provided for substantially preventing rotation of the cam 547 when uncoupled by the clutch 565 from the power shaft 515. Such uncoupling takes place, as will be seen hereinafter, twice during each cam rotation. Such means includes a dash-pot arrangement for releasably halting cam rotation in the normal direction, and a dog 579 which is engageable with a pair of angularly spaced stops 581 on the cam periphery, whereby to prevent cam movement in the other rotative direction. The stops 581 are angularly spaced to cause travel of one of the stops past the dog 579 substantially at the time or immediately before each uncoupling of the cam 547 from the power shaft by the clutch 565. The dog 579 is freely pivotally mounted on the shaft 255 and is biased toward the cam periphery by a spring 583.

The dash-pot arrangement includes a yoke 585 (see FIGURES 16 and 29) which is pivotally supported by the shaft 561 and which is connected to the plunger by a dash-pot 587 (see FIGURE 29) mounted on the frame 25. Extending from the cross bar 589 of the yoke 585 is a post 591 which projects radially inwardly for releasable engagement with an angularly spaced pair of dogs 593 carried by the cam 547. The dogs 593 are essentially identical in operation and construction. At one end, the dogs 593 are each respectively pivotally mounted to the cam. At their other or free ends, the dogs 593 are respectively connected to tension springs 595 which urge the free ends radially inwardly. The springs 595 have springs constants selected so as to permit movement of the free ends radially outwardly, under the action of centrifugal force during cam rotation into position for engagement with the post 591. Such engagement causes halting of cam rotation. Upon halting of cam rotation, the springs 595 shift the free ends of the dogs 593 inwardly to clear the post 591, thereby permitting initiation of cam rotation upon subsequent coupling of the cam 547 to the power shaft 515. The angular spacing of the dogs 593 is such that one of the dogs engages the post 591 substantially at the time of, or immediately after, each uncoupling of the cam 547 from the shaft 561 by the clutch 565. Accordingly, rotative cam movement is prevented whenever the clutch uncouples the cam from the power shaft.

In order to prevent coupling of the cam 547 to the power shaft 515 in the absence of the receipt of a stack on the bed 27 at the stack wrapping station A, and consequent operation of the tucker mechanism 225, the conveyors, and the sheet severing and feeding device D, there is provided means for sensing the presence of a stack on the bed portion 29. In the disclosed embodiment, this means takes the form of a switch button 601 (see FIGURE 32) which extends through the bed 27 and which is depressed in response to the receipt of a stack on the bed. Such depression serves to electrically energize a solenoid 603, shown in FIGURE 30. Operated by the solenoid 603 is a plunger 605 which is connected by a link 607 to the lever 575 which, midway of its length, is freely pivotal about the rock shaft 255. At one end of the lever 575 is a lug 609 adapted to engage the stop 569 in response to rotation of the cam 547 in the direction indicated by the arrows 611 in FIGURES 29 and 30. The lug 609 is normally maintained in engagement with the peripheral surface of the hub 567 for engagement with the stop 569 by means in the form of a tension spring 613 connecting the upper end of the lever 575 with the frame 25. Accordingly, when the solenoid 603 is engaged, the lug 609 is retracted and the cam 547 begins to rotate.

The cyclical operation of the apparatus is shown diagrammatically in FIGURE 31. Just prior to the time when the stack S is dropped into the stack receiving and wrapping station A, the previous cycle of operation has caused the placement of a wrapper sheet W in centered relation to the opening in the platform 111 and the conveyors have been halted. In addition, the tucker blades 227 and 229 have been located in their intermediate positions to guide sheet movement around the upper edges of the slats 169 of the auxiliary conveyors 137 and 139. This is the condition of the apparatus at point H in FIGURE 31. Upon rotation of the cam 547, travel of the follower 557 in the cam slot 555 causes insertion of the tucker blades 227 and 229 into the grippers 19 (point J in FIGURE 31), thereby inserting a bite of the wrapper sheet end portions 11 and 12 into the grippers 19.

Continued rotation of the cam 547 then withdraws the tucker blades 227 and 229 from the grippers 19. Approximately at the time the tucker blades leave the grippers (point K in FIGURE 31), the clutch actuating switch 545 is actuated by the projection 548 on the cam periphery to open the solenoid valve 541 and thereby engage the clutch 519 and release the brake 537. Engagement of the clutch 519 causes advancement of the conveyors and operation of the sheet severing and feeding device D. Further rotation of the cam 547 serves to locate the tucker blades 227 and 229 in their retracted positions to permit sheet feeding operation of the sheet severing and feeding device D. However, when the tucker blades reach their elevated retracted positions (point L in FIGURE 31), the stop 569 on the hub 567 engages the lever 577 to again uncouple the cam 547 from the power shaft 515, thereby retaining the tucker blades 227 and 229 in their elevated retracted positions during advancement of the next wrapper sheet transversely across the platform 111. The cam 547 then dwells as shown at N in FIGURE 31. However, the driving connections from the motor 501 to the conveyors and to the sheet severing and feeding device D is not disturbed and the activity of these components continues.

Such continued activity is utilized to withdraw the lever 577 from engagement with the stop 569. More particularly, carried on the upper end of the sprocket shaft 157 at the supply end of the apparatus is a cam 621 (see FIGURE 15) which contacts a follower 623 mounted on the adjacent end of a rock shaft 625 which extends lengthwise of the apparatus and is suitably supported by the frame 25. At its other end, the rock shaft 625 carries the lever 577. The cam 621 is provided with a projection 627 which serves, after travel of the next wrapper sheet past the tucker blades 227 and 229, to rock the shaft 625 in the counterclockwise direction as seen in FIGURE 29 (clockwise in FIGURE 30), thereby lifting the lever 577 out of engagement with the stop 569 and thereby again effecting coupling of the cam 547, through the clutch 565, with the continuously rotating power shaft 515 (point P in FIGURE 31).

The cam 547 then again rotates to lower the tucker blades to their intermediate positions. In the meantime, the stack S has been removed from the switch button 601, thereby de-energizing the solenoid 603 and permitting riding engagement of the lever lug 609 on the periphery of the hub 567. Accordingly, when the tucker blades 227 and 229 are located in their intermediate positions, as indicated at point H' in FIGURE 31, the stop 569 is again engaged by the lever 575 to halt further rotation of the cam 547 until another stack depresses the button 601.

Upon completion of the operational cycle of the sheet severing and feeding device D and upon advancement of the stack S through a predetermined distance from the stack receiving and wrapping station A, as indicated at point H' in FIGURE 31, the actuated 543 (see FIGURES 13 and 26) serves to electrically cause closure of the solenoid valve 541, thereby halting operation of the conveyers and the sheet feeding and severing device D. These components will thereafter remain inactive until the clutch 519 (see FIGURE 26) is again engaged in response to rotation of the cam 547 occurring incident to the deposit of another stack on the button 601. As the stack-advance during each cycle is determined by the amount of conveyer travel corresponding to one revolution of the sprocket 151, several cycles are required to transport the stack from the stack receiving and wrapping station A to the discharge end of the apparatus.

*Sheet severing and feeding device*

The sheet severing and feeding device D serves to sever a strip M of wrapping material into wrapper sheets W and to locate the sheets in a predetermined position, i.e., in centered position over the opening in the platform 111 in readiness for operation of the dump gates 113 and 115. As will be explained hereinafter, the sheet severing and feeding device D can be adjusted to provide for severance of wrapper sheets of differing lengths and is arranged to automatically position such sheets, notwithstanding their difference in length, in centered relation with respect to the opening in the platform 111.

More particularly, in the disclosed embodiment, the sheet severing and feeding device includes sheet severing means including a set or pair of co-operating rolls or rollers 701 and 703 (see FIGURES 1 and 14) and sheet feeding means including a pair of sheet-advancing endless chains 705 and 707 each carrying one or more sheet-gripping clamp means or fingers 709, together with the before-mentioned rollers 701 and 703. Still more particularly, the rollers 701 and 703 serve both to sever the sheet material into sheets and to initially advance the sheet material from a supply roll 711 or other source thereof into position for gripping by the fingers 709 to enable further advancement of the strip prior to severance thereof during the next operational cycle.

The rollers 701 and 703 are each suitably journaled in bearings supported by the frame 25 and are respectively provided with the intermeshing gears 713 to obtain concurrent rotation in opposite rotative directions. The roller 701 includes an extending knife blade 715 which co-acts with a hardened rubber anvil 717 carried by the roller 703. From the knife blade 715, the roller 701 includes a portion 719 extending, reversely from the direction of roller rotation, in an arcuate form for coaction with the opposed roller 703 to effect feeding of the newly cut end of the strip of material M. The roller 701 also includes a cut away or flat segment 721 which permits free passage of the sheet material between the rollers 701 and 703 in response to sheet advancing movement of the gripper fingers 709. Supported by the frame 25 are a pair of guides 722 (see FIGURE 32) which extends toward the delivery end of the rollers to guide the cut end of the wrapper material strip into position for gripping by the fingers 709. The power drive to the rollers 701 and 703 and the manner of actuation of the rollers will be described after a general description of other components of the sheet feeding means.

In this regard, in the disclosed embodiment, the sheet advancing chains 705 and 707 are each of roller-type construction and are trained about respective pairs of horizontally disposed, transversely spaced sprockets 723, 725, and 727, 729 carried by respective shafts 731, 733, 735, and 737 rotatably mounted on the frame 25. The sprockets 723, 725 and 727, 729 are located so that the pair of sheet advancing chains 705 and 707 are disposed in parallel relation to each other to form a pair of opposing rectilinear runs. Travel of the chains between the sprockets is guided by respective pairs of parallel troughs or guideways 739, 741, and 743, 745 which extend generally between the sprockets 723, 725, and 727, 729 and which are suitably supported by the frame 25. The guideways 739, 741, 743, and 745 are of substantially identical construction, each including, as seen best in FIGURE 36, a cover bar 747 and a pair of roller-engaging bars 749 and 751 which are horizontally spaced from each other and which are vertically spaced from the cover bar 747 by a pair of spacers 753 and 755.

While one or more sheet-gripping fingers 709 can be carried by each of the sheet advancing chains 705 and 707, in the disclosed embodiment, each chain carries two gripper fingers which are diametrically oppositely supported, as the chain is advanced one half of its length from each cycle.

Each gripping finger 709 includes a block 771 attached to a pair of extra-long hinge pins 773 interconnecting adjacent chain links. Extending from the top of the block 771 adjacent to one side thereof, is a projection 775 which bears against the underside of the roller-engaging bar 751 shown to the left in FIGURE 36, thereby guiding travel of the block 771 along the undersurface of the guideways. Extending outwardly from the other side of the block 771, at the bottom thereof, is a leg or foot 779 having a chamfered leading edge 781. Pivotally mounted on the block 771 above the leg 779 on an axis parallel to the leg is a clamp 783 which includes a clamping surface 785 co-operable with the upper surface of the leg 779 to frictionally grip the sheet material therebetween.

The upper end of the clamp 783 includes a camming surface 787 which is engageable by means still to be described to pivot the clamping surface 785 away from the leg 779, thereby permitting insertion of the sheet material between the leg 779 and the clamp 783 prior to closure of the clamp toward the leg, and thereby permitting subsequent release of the sheet from frictional engagement between the clamp 783 and the leg 779. Means in the form of a spring 789 is provided for biasing the clamp for engagement of the clamping surface 785 with the leg 779.

In order to open the fingers 709 to facilitate gripping of the sheet material as the fingers complete movement about the sprockets 723 and 727, cams 791 and 793 extend arcuately with the camming surface 787 to lift the clamping surfaces 785 from the legs 779. Thus, when the fingers 709 intersect the side edges of the end portion 11 of the sheet material previously advanced by the rollers 701 and 703, the legs 779 travel under the side edges of the sheet material while the clamps 783 swing over the side edges of the sheet material. The finger-opening cams terminate immediately after entry of the fingers onto the rectilinear runs defined by the guideways 741 and 743, thereby effecting clamping or gripping of the sheet material by the action of the springs 789.

In order to open the fingers 709 and thereby release the severed wrapper sheet onto the platform 111, cams 795 and 797 (see FIGURE 32) are fixed to respective blocks 799 and 801 which are slidably carried respectively on the guideways 741 and 743. Each of the cams 795 and 797 includes a camming edge 803 (see FIGURES 37 and 38) engageable with the camming surface 787 of the finger clamps 783. As will be seen hereinafter, the cams are adjustably displaceable lengthwise along the guideways to variably determine the point of wrapper sheet release.

In order to retain the wrapper sheet W in proper position on the platform 111 after release from the gripping fingers 709, and to partially guide displacement of the wrapper sheet during wrapping thereof around the stack at the stack-receiving and wrapping station A, respective pairs of sheet-engaging blades or fingers 805 and 807, are provided on each side of the apparatus. The blades are fabricated of spring material and are supported by the frame 25. The terminal ends of the blades 805 are upturned, as indicated at 806, to prevent interference with advance of the wrapper sheet across the platform 111 by the fingers 709.

The sheet-advancing chains 705 and 709 are driven respectively through the sprockets 723 and 727 carried on the respective shafts 731 and 735, which shafts extend respectively from gear boxes 811 and 813 (see FIGURE 12) mounted on the frame. Concurrent operation of the chains 705 and 709 is obtained by connecting the gear boxes 811 and 813 through a shaft 815. Extending from the gear box 813 shown to the right in FIGURE 12, is a stub shaft 817 which is connected through a power train to the gear box 503. More specifically, the stub shaft 817 is connected through a universal coupling 819 with one end of an elongated power shaft 821. At its other end, the power shaft 821 is connected through a universal coupling 823 with a gear box 825 which, in turn, is connected through the chain drive 535 with the sprocket 553 on the unitary wheel 521 of the clutch 519.

Extending from the gear box 811 shown at the lower right in FIGURE 32 is a stub shaft 827 carrying a sprocket 829 around which there is trained a chain 831 engaged with a sprocket 833 which is freely rotatable about a shaft 835 extending axially from the roller 701. The sprocket 833 is connected to the shaft 835 by means for actuating the rollers 701 and 703 for a single revolution once for each advance of the sheet-gripping fingers 709 across the platform 111 and at such predetermined time as will determine the length of the wrapper sheet.

In the disclosed embodiment, this means includes a conventional one-revolution clutch 837 for coupling and uncoupling the sprocket 833 to the shaft 835. The clutch 837 includes a hub 839 having, on the periphery thereof, a stop 841 (see FIGURE 34) disposed for engagement by a lug 842 to prevent coupling of the sprocket 833 to the shaft 835. The lug 842 is carried at the end of an arm 843 which is pivotally mounted on a bracket 845 supported by the frame 25. The arm 843 is biased by spring means 847 for engagement of the hub periphery by the lug 842. Also mounted on the shaft 835 is a conventional brake 848 which functions to prevent rotation of the shaft 835 when the shaft 835 is uncoupled from the sprocket 833 and which is overpowered when the clutch connects the sprocket 833 to the shaft 835.

Connected to the arm 843 to retract the lug 842 from engagement with the stop 841 so as to effect coupling of the sprocket 833 to the shaft 835 is a transversely extending, elongated actuating link 849. Connected to the link 849 is one end of a bell crank lever 851 which is pivotally mounted on a block 853 secured to the guideway 741. At its other end, the bell crank lever 851 carries a follower 855 which is engaged with a horizontally elongated undersurface 857 of the long or horizontal leg of an L shaped member 859.

The L shaped member 859 is supported by means affording movement thereof relative to an elongated carriage 861 which is slideably mounted on the guideway 741 to accommodate adjustable positioning of the L shaped member 851. More specifically, the support means includes, in the long leg of the L shaped member 859, a series of inclined slots 863 which extend downwardly and to the left as seen in FIGURE 34, and a series of headed studs 865 which extends through the slots 863 and are threaded into the carriage 861. As a consequence, the L shaped member 859 is movable downwardly and to the left as seen in FIGURE 34 relative to the carriage 861 to effect rotation of the bell crank lever 851 in the counterclockwise direction, as seen in FIGURE 34, thereby displacing the actuating link 849 to the left as seen in FIGURE 34, so as to withdraw the lug 842 from engagement with the stop 841 and to effect rotation of the rollers 701 and 703 through a single revolution.

At the lower end of its shorter or vertical leg, the L shaped member 859 includes an ear 867 which extends inwardly under the guideway 741 in the path of travel of the sheet-gripping fingers 709. The ear 867 includes a camming surface 869 adapted for engagement by a camming surface 871 on the lower face of the block 771 in response to travel of the gripping fingers 709 along the run defined by the guideway 746. Such engagement causes momentary movement of the L shaped member 859 downwardly and toward the left as seen in FIGURE 34, thereby temporarily withdrawing the lug 842 from the stop 841 and causing rotation of the rollers 701 and 703.

Means in the form of a tension spring 875 anchored to pins 877 and 879 extending respectively from the L shaped member 859 and the carriage 861 serves to bias the L shaped member 859 toward the position shown in FIGURE 34, thereby permitting engagement of the lug 842 with the periphery of the clutch hub 839 under the action of the spring 847.

*Adjusting mechanism for accommodating variation in stack height*

As is well known, the number of pages and over-all thickness of newspaper varies from day to day. Accordingly, a stack S of a predetermined number of newspapers will also vary in height from day to day. In order to accommodate variation in stack height, the illustrated apparatus includes co-ordinated means for varying the distance between the convergent surfaces 13 and 15 between which the stack S is compressed, for varying the length of the wrapper sheet W which is folded about the stack, and for varying the point of wrapper sheet release from the sheet-advancing fingers so that the wrapper sheets are reliably positioned in centered relation on the platform 111, notwithsatnding variation in their length.

More particularly, while various means or arrangements can be used, in the disclosed embodiment, variation in the distance between the inclined endless belt mechanism 301 and the bed 27 is obtained by mounting the bed, at each corner, on respective vertically extending jack screws 901, 903, 905 and 907. The jack screws are rotated in unison by a chain drive including a sprocket chain 909 which is trained around respective sprockets on each of the jack screws. Power for raising and lowering the bed 27 is supplied by a drive motor 911 which is mounted on the frame 25 and which is connected through a gear box 913 and a chain 915 to a sprocket 917 fixed to the upper end of the jack shaft 901.

While various means or arrangements can be used, in the disclosed embodiment, variation in the length of each wrapper sheet is obtained by varying the time at which the rollers 701 and 703 are actuated during travel of the sheet-gripping fingers 709 across the platform 111. In this regard, the carriage 861 (see FIGURES 32 and 34) is threaded on a first portion 921 of a differentially threaded screw or shaft 923 which extends the length of the guideway 741 supporting the carriage 861 and which is suitably journaled thereon. At the end thereof adjacent to the rollers 701 and 703, the screw 923 is provided with a sprocket 925 about which there is trained a chain 927. In turn, the chain 927 is engaged about a second sprocket 929 at the end of a shaft 931 which is suitably journaled by the frame 25 and which extends from a gear box or right-angle drive 933 mounted on the jack screw 901. Accordingly, rotation of the jack screw 901 to raise and lower the bed 27 also affects related displacement of the carriage 861, thereby effecting the time of operation of the rollers 701 and 703.

While various means or arrangements can be used, in the disclosed embodiment, variation of the point of release of the wrapper sheet from the sheet-gripping fingers 709 is provided by threaded engagement of the block 799 carrying the cam 795 on a second portion 935 of the differentially threaded screw 923. In order to displace the point of sheet release through one half the amount of variation in length, the pitch of the second threaded portion 935 is one half the pitch of the first threaded portion 921.

In order to simultaneously open the sheet-advancing fingers 709 carried by both chains 701 and 703, the block 801 carrying the cam 797 is threaded on a screw or shaft 937 which extends longitudinally of the guideway 743, which is suitably journaled thereon, and which includes, at one end, a sprocket 939 connected by a chain 941 to a sprocket 943 fixed to the other screw 923. Accordingly, both cams 795 and 797 are displaced in unison in accordance with displacement of the carriage 861 and with raising and lowering of the bed 27.

What is claimed is:

1. A stack bundling apparatus including a frame, means on said frame for advancing a strip of wrapping material from a source thereof, means on said frame adjacent to the path of advancement of the wrapping material strip for severing a wrapper sheet from the wrapping material strip, means on said frame for co-ordinating said strip advancing means and said strip severing means to variably predetermine the length of the wrapper sheet, means on said frame co-ordinated with said means co-ordinating said strip advancing and said strip severing means to variably predetermine the length of the wrapper sheet, means on said frame co-ordinated with said means co-ordinating said strip advancing and said strip severing means for variably predetermining the advancement of the wrapper sheet from said strip severing means to locate the wrapper sheet in centered relation to a predetermined point, means on said frame adjacent to said point for folding the wrapper sheet around three serially extending sides of a stack, means on said frame defining a pair of convergent surfaces, means on said frame for transporting the stack between said convergent surfaces to compress the stack into a condition of reduced height, and means on said frame operable, while the stack is maintained in said condition of reduced height, for folding the end portions of the wrapper sheet into encircling relation to the stack and into mutual engagement and for uniting the end portions of the wrapper sheet.

2. A stack bundling apparatus including a frame, means on said frame for advancing a strip of wrapping material from a source thereof, means on said frame adjacent to the path of advancement of the wrapping material strip for severing a wrapper sheet from the wrapping material strip, means on said frame for co-ordinating said strip advancing means and said strip severing means to variably predetermine the length of the wrapper sheet, means on said frame co-ordinated with said means co-ordinating said strip advancing and said strip severing means for variably predetermining the advancement of the wrapper sheet from said strip severing means to locate the wrapper sheet in centered relation to a predetermined point, means on said frame adjacent to said point for folding the wrapper sheet around three serially extending sides of a stack with end portions of the wrapper sheet extending outwardly from the stack, means on said frame defining a pair of convergent surfaces, means on said frame for conveying the stack from the wrapper sheet folding means and between said convergent surfaces to compress the stack into a condition of reduced height, means on said frame adjacent to said stack conveying means for releasably gripping and transporting the wrapper sheet in accordance with advancement of the stack, means on said frame operable, while the stack is maintained in said condition of reduced height, for releasing the grip of said sheet-gripping and transporting means, for folding the end portions of the wrapper sheet into mutual engagement with each other and in encircling relation to the stack, and for uniting the end portions of the wrapper sheet.

3. Apparatus in accordance with claim 2 wherein said wrapper sheet-gripping and transporting means includes a gripper advanced in accordance with the advancement of the stack and a tucker blade movable transversely of the disposition of one end portion of the wrapper sheet and relative to said gripper between a retracted position spaced from said gripper and an extending position within said gripper, whereby the one end portion of the wrapper sheet is inserted in said gripper in response to movement of said tucker blade to its extending position.

4. Apparatus in accordance with claim 3 including drive and control means on said frame comprising a drive motor, means connected to said drive motor for intermittently and simultaneously powering said stack conveying means, said wrapper sheet-gripping and transporting means, said strip severing means, and said strip feeding means, said powering means including a releasably engageable clutch, means for engaging said releasably engageable clutch, said clutch engaging means including a second clutch connected to said drive motor, a cam driven by said second clutch, and an actuator operated by said cam to effect engagement of said releasably engageable clutch to drive said stack conveying means, said wrapper sheet-gripping and transporting means, said strip severing means, and said strip feeding means, means for releasably preventing rotation of said cam to operate said actuator in the absence of the folding of the wrapper sheet around the three serially extending sides of the stack, means for releasably preventing continued rotation of said cam until after said stack conveying means has advanced through a predetermined advance, thereby facilitating operation of said strip severing means and said strip feeding means, means operable after advance of said stack conveying means through a predetermined distance greater than said predetermined advance for disengaging said releasably engageable clutch, and means on said cam connected to said tucker blade for displacing said tucker blade, in response to rotation of said cam, to and from its extending position subsequent to release of said cam rotation preventing means and prior to operation of said actuator and for displacing said tucker blade to its retracted position prior to release of said continued cam rotation preventing means.

5. A stack bundling apparatus including a frame, means on said frame for advancing a strip of wrapping material from a source thereof, means on said frame adjacent to the path of advancement of the wrapping material strip for severing a wrapper sheet from the wrapping material strip, means on said frame for co-ordinating said strip advancing means and said strip severing means to variably predetermine the length of the wrapper sheet in accordance with the height of the stack to be wrapped, means on said frame co-ordinated with said means co-ordinating said strip advancing and said strip severing means for variably predetermining the advancement of the wrapper sheet from said strip severing means to locate the wrapper sheet in centered relation to a predetermined point, means on said frame adjacent to said point for folding the wrapper sheet around three serially extending sides of a stack with end portions of the wrapper sheet extending outwardly from the stack, means on said frame defining a pair of convergent surfaces, means on said frame for adjustably spacing one of said convergent surfaces with respect to the other of said convergent surfaces to accommodate stacks of different height, means on said frame for transporting the stack between said convergent surfaces to compress the stack into a condition with a reduced dimension, and means on said frame operable, while the stack is maintained in said reduced dimension condition, for folding the end portions of the wrapper sheet into encircling relation to the stack and into mutual engagement and for uniting the end portions of the wrapper sheet.

6. Apparatus in accordance with claim 5 including means on said frame for co-ordinating said strip advancing and strip severing co-ordinating means, said sheet advancement predetermining means, and said convergent surface spacing means.

7. A stack bundling apparatus including a frame, means on said frame for folding a wrapper sheet around three serially extending sides of a stack, said wrapper sheet folding means comprising a wrapper sheet supporting means having therein an opening, a U-shaped receptacle disposed under said supporting means in centered position with respect to said opening, said receptacle including a bottom in spaced relation to said supporting means and a pair of stack-confining side walls extending to adjacent said opening, means for locating a wrapper sheet on said supporting means in centered position with respect to said opening and with the end portions of the wrapper sheet extending outwardly from said receptacle walls, and means for depositing a stack on said wrapper sheet for passage through said opening onto said receptacle bottom so as to draw the wrapper sheet into said receptacle and thereby fold the wrapper sheet about the bottom and two sides of the stack, means on said frame defining a pair of convergent surfaces, means on said frame for transporting the stack between said convergent surfaces to compress the stack into a condition of reduced height, and means on said frame operable, while the stack is maintained in said condition of reduced height, for folding the end portions of the wrapper sheet into encircling relation to the stack and into mutual engagement, and for uniting the end portions of the wrapper sheet.

8. Apparatus in accordance with claim 7 wherein said stack depositing means comprises a pair of dump tongs, and means mounting said dump tongs above said opening for movement to and from a stack supporting position to afford receipt of a stack and subsequent dumping of the stack.

9. Apparatus in accordance with claim 7 wherein said wrapper sheet locating means comprises means for advancing a strip of wrapping material from a source thereof, means adjacent to the path of advancement of the wrapping material strip for successively severing the wrapping material strip into sheets, means for co-ordinating said strip advancing means and said strip severing means to predetermine the length of the sheets, and means co-ordinated with said means co-ordinating said strip advancing and said strip severing means for predetermining the advancement of the sheets from said strip severing means to locate the sheets in said centered position.

10. A stack wrapping apparatus comprising a frame, an elongated bed on said frame, means on said frame spaced above one portion of said bed for supporting a wrapper sheet entirely above said one bed portion, spaced sheet folding means on said frame spaced above said one portion of said bed and adjacent to said sheet supporting means whereby, when a wrapper sheet is supported on said sheet supporting means above said sheet folding means and a stack to be wrapped is engaged with the wrapper sheet, passed between said spaced sheet folding means, and deposited on said one portion of said bed, the wrapper sheet is folded about three serially extending sides of the stack with opposite end portions of the wrapper sheet extending outwardly from the stack, means on said frame adjacent to said bed for conveying the stack and the wrapper sheet along said bed from said one portion thereof, means including another portion of said bed and a surface supported on said frame in convergent relation to said other bed portion for compressing the stack in response to movement of the stack and the wrapper sheet along said bed, and means on said frame operable, while the stack is maintained in compressed condition, for folding the end portions of the wrapper sheet into mutual engagement with each other and in encircling relation to the stack and for uniting the end portions of the wrapper sheet.

11. Apparatus for wrapping stacks of variably predetermined height, said apparatus comprising a frame, an elongated bed on said frame, means on said frame above one portion of said bed for supporting a wrapper sheet, spaced sheet folding and stack confining means on said frame above said one portion of said bed and adjacent to said sheet supporting means whereby, when a wrapper sheet is supported on said sheet supporting means above said sheet folding means and a stack to be wrapped is engaged with the wrapper sheet, passed between said spaced sheet folding and stack confining means, and deposited on said one portion of said bed, the wrapper sheet is folded about three serially extending sides of the stack with opposite end portions of the wrapper sheet extending outwardly from the stack, means on said frame adjacent to said bed for conveying the stack and wrapper sheet along said bed from said one portion thereof, means including another portion of said bed and a surface on said frame convergent with said other bed portion for compressing the stack in response to movement of the stack and the wrapper sheet along said bed, means on said frame operable, while the stack is maintained in compressed condition, for folding the end portions of the wrapper sheet into mutual engagement with each other and in encircling relation to the stack and for uniting the end portions of the wrapper sheet, and means on said frame for adjustably displacing said bed along the direction of compression of the stack.

12. Apparatus in accordance with claim 11 wherein said stack and wrapper sheet conveying means and said sheet folding and stack confining means comprise a pair of conveyers disposed in parallel relation to each other and having opposed runs located in vertical planes adjacent to the sides of said bed.

13. Apparatus in accordance with claim 12 wherein said surface supported on said frame in convergent relation to said other bed portion constitutes one run of a stack-compressing endless member disposed between said pair of conveyors.

14. A stack wrapping apparatus comprising a frame, an elongated bed on said frame, means on said frame above one portion of said bed for supporting a wrapper sheet, spaced sheet folding means on said frame above said one portion of said bed and adjacent to said sheet supporting means whereby, when a wrapper sheet is supported on said sheet supporting means above said sheet folding means and a stack to be wrapped is engaged with the wrapper sheet, passed between said spaced sheet folding means, and deposited on said one portion of said bed, the wrapper sheet is folded about three serially extending sides of the stack with opposite end portions of the wrapper sheet extending outwardly from the stack, means on said frame adjacent to said bed for conveying the stack along said bed from said one portion thereof, means on said frame adjacent to said stack conveying means for releasably gripping and transporting the wrapper sheet in accordance with advancement of the stack, means including another portion of said bed and a surface on said frame converging toward said bed for compressing the stack in response to movement of the stack and the wrapper sheet along said bed, and means on said frame operable, while the stack is maintained in compressed condition, for releasing the grip of said sheet gripping and transporting means, for folding the end portions of the wrapper sheet into mutual engagement with each other and in encircling relation to the stack, and for uniting the end portions of the wrapper sheet.

15. Apparatus in accordance with claim 14 wherein said wrapper sheet-gripping and transporting means includes a gripper advanced in accordance with the advancement of the stack along a path adjacent to said sheet folding means, said grippers having releasing handles, a tucker blade disposed in adjacent relation to said sheet folding means and movable transversely of the disposition of one end portion of the wrapper sheet and relative to said gripper between a first, retracted position spaced from said gripper and above said sheet supporting means, whereby to facilitate placement of the wrapper sheet on said sheet supporting means, a second, intermediate position in adjacently spaced relation to said grippers, whereby to confine the travel of the wrapper sheet between said gripper and said tucker blade during folding of the wrapper sheet around the stack and a third, extending position within said gripper, whereby to insert the one end portion in said gripper, and said means for releasing the grip of said sheet-gripping and transporting means comprises a cam disposed for engagement by said handle to release said gripper after compression of the stack and prior to folding of the wrapper sheet end portions into encircling relation to the stack.

16. Apparatus in accordance with claim 16 wherein said stack conveyor means comprises a first pair of conveyers disposed in parallel relation to each other, having opposed runs located in vertical plnaes adjacent to the sides of said bed, and having vertically extending stack pushing bars, said sheet folding means and said sheet-gripping and transporting means include a second pair of conveyers disposed in parallel relation to each other, having opposed runs located in said vertical planes adjacent to the sides of said bed and adjacently above said first pair of conveyers, and being advanced in accordance with the advancement of said first pair of conveyers, and said sheet-gripping and transporting means includes vertically extending stack pusher bars mounted on said second pair of conveyors, grippers mounted on said second pair of conveyors adjacent to the top edge thereof, and a pair of spaced tucker blades movable transversely of the disposition of the end portions of the wrapper sheet and relative to said grippers between retracted positions spaced from said grippers and extending positions within said grippers, whereby the end portions of the wrapper sheet are inserted in said grippers in response to movement of said tucker blades to their extending positions.

17. Apparatus in accordance with claim 16 wherein said sheet-gripping and transporting means includes means mounting said stack pushers bars on said second pair of conveyers for movement, during advancement in said vertical planes disposed adjacent to the sides of said bed, between extended positions projecting toward the stack for engagement therewith and retracted positions in generally co-planar relation to conveyer portions adjacent thereto, and followers on said stack pusher bars, and said means for releasing the grip of said sheet-gripping and stack transporting means comprises cam means disposed for engagement by said followers for effecting movement of said stack pusher bars to their extended positions prior to arrival in adjacent relation to said one portion of said bed and for effecting movement of said stack pusher bars to their retracted positions prior to arrival in adjacent relation to said convergent surfaces.

18. Apparatus for wrapping stacked material having a variably predetermined dimension which is reduceable in magnitude, said apparatus comprising a frame, an elongated bed on said frame, means on said frame above one portion of said bed for supporting a wrapper sheet, spaced sheet folding means on said frame above said one portion of said bed and adjacent to said sheet supporting means, means on said frame for advancing a strip of wrapping material from a source thereof toward said sheet supporting means, means on said frame adjacent to the path of advancement of the wrapping material strip for successively severing the wrapping material strip into wrapper sheets, means on said frame for co-ordinating said strip advancing means and said strip severing means to variably predetermine the length of the sheets in accordance with the magnitude of the variably predetermined dimension of the stacked material to be wrapped, means on said frame co-ordinated with said means co-ordinating said strip advancing and said strip severing means for variably predetermining the advancement of the sheets of variable predetermined length from said strip severing means to locate the sheets on said sheet supporting means in centered relation with respect to said sheet folding means, means on said frame for successively depositing stacked material to be wrapped between said sheet folding means and onto said one portion of said bed whereby, when a wrapper sheet is supported on said sheet supporting means, the wrapper sheet is engaged with and folded about three serially extending sides of the stacked material with opposite end portions of said wrapper sheet extending outwardly from the stacked material, means on said frame adjacent to said bed for conveying the stacked material along said bed from said one portion thereof, means on said frame adjacent to said stack conveying means for releasably gripping and transporting the wrapper sheet with the stacked material, means including another portion of said bed and a surface on said frame convergent with said bed for compressing the stacked material in response to movement of the stacked material and the wrapper sheet along said bed, means on said frame operable, while the stacked material is maintained in compressed condition, for releasing the grip of said sheet gripping and transporting means, for folding the end portions of the wrapper sheet into mutual engagement with each other and in encircling relation to the stacked material, and for uniting the end portions of the wrapper sheet, means on said frame for adjustably displacing said bed along the direction of compression of the stacked material in accordance with the magnitude of the variably predetermined dimension of the stacked material, and means on said frame for coordinating said strip advancing and strip severing coordinating means, said sheet advancement predetermining means, and said bed displacing means.

19. Sheet severing and feeding apparatus comprising a frame, means on said frame for advancing a strip of wrapping material from a source thereof, said strip advancing means comprising a pair of rollers engaged with the wrapping material strip to advance the strip a predetermined amount in response to each revolution of said rolls, and means for releasably gripping said wrapping material strip and for advancing said wrapping material strip beyond said predetermined amount, means on said frame adjacent to the path of advancement of the wrapping material strip for severing a sheet from the wrapping material strip, means on said frame for co-ordinating said strip advancing means and said strip severing means to variably predetermine the length of the sheet, and means on said frame co-ordinated with said means co-ordinating said strip advancing and said strip severing means for variably predetermining the advancement of the sheet from said strip severing means to locate the sheet in centered relation to a predetermined point.

20. Apparatus in accordance with claim 19 wherein one of said rollers includes a section of reduced radius to permit free passage of the strip between said rollers, whereby to facilitate advancement by said releasable gripping means independently of said rollers, and one of said rollers includes a knife blade disposed for co-action with the other roller for severing the wrapping material strip into wrapper sheets.

21. A sheet severing and feeding apparatus comprising a frame, a pair of rollers mounted on said frame for passage therebetween of a strip of wrapping material from a source thereof, said rollers being interconnected for concurrent rotation in opposite directions and including means operable, in sequence, for severing a wrapper sheet from the wrapping material strip during a first portion of each revolution of said rollers, for advancing the wrapping material strip through a predetermined amount during a second portion of each revolution of said rollers, and for permitting free passage of the wrapping material strip between said rollers during a third portion of each revolution of said rollers, means for releasably gripping said wrapping material strip and for advancing said wrapping material strip beyond said predetermined amount during said third portion of each revolution of said rollers, means for initiating rotation of said rollers through one revolution in response to one portion of the advance of the wrapper strip by said gripping and advancing means, and means engaging said releasable gripping and advancing means to effect wrapper sheet release therefrom during wrapper sheet advance independently of the wrapping material strip.

22. Sheet severing and feeding apparatus comprising a frame, a pair of rollers mounted on said frame for passage therebetween of a strip of wrapping material from a source thereof, said rollers being interconnected for concurrent rotation in opposite directions and including means operable, in sequence, for severing a wrapper sheet from the wrapping material strip during a first portion of each revolution of said rollers, for advancing the wrapping material strip through a predetermined amount during a second portion of each revolution of said rollers, and for permitting free passage of the wrapping material strip between said rollers during a third portion of each revolution of said rollers and during a dwell after each revolution, means for releasably gripping said wrapping material strip and for advancing said wrapping material strip beyond said predetermined amount during said third portion of each revolution of said rollers and during said dwell, means for initiating rotation of said rollers through one revolution in response to one portion of the advance of the wrapper strip by said gripping and advancing means, means engaging said releasable gripping and advancing means to effect wrapper sheet release therefrom during wrapper sheet advance independently of the wrapping material strip, means for varying the occurrence of actuation of said roller rotation initiating means, whereby to vary the length of each wrapper sheet, and means co-ordinated with said first mentioned varying means for varying the occurrence of release of the said wrapper sheet, whereby the wrapper sheet is uniformly positioned in centered relation to a given point, notwithstanding variation in wrapper sheet length.

23. In a bundle wrapping machine the combination with means defining a wrapping chamber including a bed and a pair of conveyers at opposite sides of the bed, of means for feeding a length of web of wrapping material across said chamber, and means for depositing upon said web and into the said chamber a bundle to be wrapped, whereby the length of web is serially folded about three sides of the bundle, the bundle and web being supported on the bed and confined between said conveyers.

24. A bundle wrapping machine comprising means defining a wrapping chamber including a bed and a pair of conveyers at opposite sides of the bed, means for feeding a length of web of wrapping material across said chamber, means for depositing upon said web and in said chamber a bundle to be wrapped, the bundle and web being supported on the bed and confined between said conveyers, means for vertically adjusting the bed between the conveyers according to the height of the bundle to be wrapped, and means for effecting corresponding adjustment in length of the web of wrapping material.

25. A bundle wrapping machine according to claim 24 in which said last means includes means for keeping the web substantially centered with respect to the bundle, notwithstanding changes of web length and bundle height.

26. A bundle wrapping machine comprising means defining a wrapping chamber including a bed and a pair of conveyers at opposite sides of the bed, a web supply roll, means for feeding a length of web of wrapping material from said web supply roll and across said chamber and including a feed roll set including feed rolls at opposite sides of the web and having portions mutually engageable in feeding relation to the web and other portions spaced to accommodate free movement of the web, means for effecting limited rotation of the feed roll set to engage and advance the end of the web and for arresting such rotation with said other roll portions spaced to clear the web, conveyer means including web engaging clamp means for grasping and advancing the end of the web for pulling it between the spaced portions of the feed roll means after the feed roll rotation is arrested, and means for severing the web to constitute a sheet of wrapping material, and means for depositing upon said web and in said chamber a bundle to be wrapped, the bundle and the web being supported on said bed and confined between said conveyers.

27. A bundle wrapping machine according to claim 26 wherein said last mentioned conveyer means includes a pair of laterally disposed conveyers above the conveyers first mentioned and spaced therefrom to accommodate the movement of the end of the wrapping web across said chamber.

28. A bundle wrapping machine comprising means defining a wrapping chamber including a bed and a pair of conveyers at opposite sides of said bed, means for feeding a length of web of wrapping material across said chamber, and means for depositing upon said web and in said chamber a bundle to be wrapped, the bundle and the web being supported on said bed and confined between said conveyers, said conveyers being respectively provided along their upper margins with frictional clamp means for the releasable retention of portions of the wrapping web at opposite sides of said chamber, and means for tucking into said clamp means portions of the web to be retained therein during the advance of said conveyers.

29. A bundle wrapping machine according to claim 28 in further combination with means for withdrawing the tucking means from the path of feed of the wrapping web during the advance of said web across said chamber.

30. A bundle wrapping machine comprising means defining a wrapping chamber including a bed and a pair of conveyers at opposite sides of said bed, means for feeding a length of a web of wrapping material across said chamber, means for depositing upon said web and in said chamber a bundle to be wrapped, the bundle and the web being supported on said bed and confined between said conveyers, conveyer driving means including a motor, and means for energizing said motor upon the arrival of a bundle and a length of wrapping web in said chamber between said conveyers.

31. A bundle wrapping machine according to claim 30 in which said last means includes a switch in operative connection to the motor and disposed on said bed to receive the weight of a bundle deposited in said chamber.

32. In a bundle wrapping machine, the combination with chamber forming means including a bed and laterally spaced conveyers, of means for drawing a length of wrapping web across said chamber, means for depositing upon said length of wrapping web and in said chamber a bundle of material to be wrapped, means for thereupon initiating the advance of said conveyers for propelling the bundle and said length of wrapping web along said bed, means for compressing the bundle toward said bed in the course of said advance, means for supporting end portions of the length of wrapping web against crumpling during the compression of the bundle and the advance of the web and bundle, means for gluing a projecting end portion of the length of wrapping web in the course of such advance, and means for folding over the bundle another end portion of said wrapping web and thereupon folding over said other portion the end portion glued as aforesaid whereby to envelop the compressed bundle in a continuous wrapper.

References Cited

UNITED STATES PATENTS

| | | | |
|---|---|---|---|
| 1,711,228 | 4/1929 | Duvall et al. | 53—198 X |
| 2,762,176 | 9/1956 | Knapp et al. | 53—66 |
| 2,962,848 | 12/1960 | Wilson | 53—124 |
| 2,996,859 | 8/1961 | Winkler et al. | 53—124 |
| 3,029,571 | 4/1962 | Douthit | 53—66 |
| 3,044,228 | 7/1962 | Peterson | 53—24 |
| 3,056,245 | 10/1962 | Baum et al. | 53—24 |
| 3,150,475 | 9/1964 | Schooler | 53—228 X |

TRAVIS S. McGEHEE, *Primary Examiner.*

FRANK E. BAILEY, *Examiner.*

R. L. FARRIS, A. E. FOURNIER, *Assistant Examiners.*

UNITED STATES PATENT OFFICE
CERTIFICATE OF CORRECTION

Patent No. 3,343,334　　　　　　　　　　　　September 26, 1967

Robert H. Bode et al.

It is hereby certified that error appears in the above numbered patent requiring correction and that the said Letters Patent should read as corrected below.

Column 3, line 18, for "crumping" read -- crumpling --; column 12, line 58, for "actuated" read -- actuator --; column 14, line 73, for "sprocket 553" read -- sprocket 533 --; column 17, lines 1 to 4, strike out "to variably predetermine the length of the wrapper sheet, means on said frame co-ordinated with said means co-ordinating said strip advancing and said strip severing means"; column 20, line 61, for the claim reference numeral "16" read -- 14 --; line 64, for "plnaes" read -- planes --; line 69, for "opposed" read -- opposing --; column 21, line 11, for "pushers" read -- pusher --.

Signed and sealed this 22nd day of October 1968.

(SEAL)
Attest:

Edward M. Fletcher, Jr.　　　　　　　　　　　　EDWARD J. BRENNER
Attesting Officer　　　　　　　　　　　　　　　Commissioner of Patents